(12) United States Patent
Bollapalli et al.

(10) Patent No.: US 10,278,106 B2
(45) Date of Patent: Apr. 30, 2019

(54) OPTIMIZATIONS FOR VOICE HANDOVERS OVER WIRELESS DATA ACCESS

(71) Applicant: Ribbon Communications Operating Company, Inc., Westford, MA (US)

(72) Inventors: Nagesh Kumar Bollapalli, Bangalore (IN); Anuradha Sridhar, Plano, TX (US); Rajiv Harish Patel, Newark, CA (US); Pradeep Bala, Bangalore (IN)

(73) Assignee: Ribbon Communications Operating Company, Inc., Westford, MA (US)

( * ) Notice: Subject to any disclaimer, the term of this patent is extended or adjusted under 35 U.S.C. 154(b) by 4 days.

(21) Appl. No.: 15/499,786

(22) Filed: Apr. 27, 2017

(65) Prior Publication Data
US 2018/0063764 A1 Mar. 1, 2018

(30) Foreign Application Priority Data
Aug. 24, 2016 (IN) .............................. 201641028807

(51) Int. Cl.
| | | |
|---|---|---|
| *H04W 36/24* | (2009.01) | |
| *H04W 60/04* | (2009.01) | |
| *H04L 29/06* | (2006.01) | |
| *H04W 36/14* | (2009.01) | |
| *H04W 12/06* | (2009.01) | |
| *H04W 76/10* | (2018.01) | |
| *H04W 88/06* | (2009.01) | |
| *H04W 84/12* | (2009.01) | |

(52) U.S. Cl.
CPC ......... *H04W 36/24* (2013.01); *H04L 63/0435* (2013.01); *H04L 63/166* (2013.01); *H04L 69/22* (2013.01); *H04W 12/06* (2013.01); *H04W 36/14* (2013.01); *H04W 60/04* (2013.01); *H04W 76/10* (2018.02); *H04L 63/0892* (2013.01); *H04W 84/12* (2013.01); *H04W 88/06* (2013.01)

(58) Field of Classification Search
CPC ............. H04L 2209/80; H04L 63/0435; H04L 63/0892; H04L 63/166; H04L 69/22; H04W 12/06; H04W 36/14; H04W 36/24; H04W 60/04; H04W 76/10; H04W 84/12; H04W 88/06
See application file for complete search history.

(56) References Cited

U.S. PATENT DOCUMENTS

2006/0262732 A1* 11/2006 Joutsenvirta .......... H04W 28/18
                                                                 370/254
2017/0195932 A1*  7/2017 McDiarmid .......... H04W 36/26

* cited by examiner

*Primary Examiner* — Kan Yuen
(74) *Attorney, Agent, or Firm* — Straub & Straub; Stephen T. Straub; Michael P. Straub

(57) ABSTRACT

Systems, methods, and computer-readable storage media are disclosed which provide improved performance for packet switched (PS)-to-PS handovers. Embodiments provide for improved handover operations by utilizing registration refreshing techniques to reduce the time required to complete signaling and registration of a UE over a target access in connection with a handover of a communication session from a serving access to the target access. Embodiments further provide improved handover operations that eliminate the exchange of signaling information with a remote UE in connection with a handover of a communication session from a serving access to the target access. Further, handover operations are processed by a network node that is closer to the UE requesting the handover (e.g., the network node may be an Access-SBC/P-CSCF that operates between a core network and the UE).

12 Claims, 9 Drawing Sheets

OPTIMIZATIONS FOR VOICE HANDOVERS OVER WIRELESS DATA ACCESS

RELATED APPLICATIONS

The present application claims the benefit of Indian Provisional Patent Application S.N. 201641028807 filed on Aug. 24, 2016 which is hereby expressly incorporated by reference in its entirety

TECHNICAL FIELD

The invention relates generally to telecommunications and, more particularly, to handling of voice call handovers between different access networks, specifically wireless fidelity (Wi-Fi) networks and cellular networks.

BACKGROUND OF THE INVENTION

Cellular networks, such as long term evolution (LTE)/fourth generation (4G) cellular networks, have gained wide acceptance from both service providers/operators and their respective user communities (e.g., because of the ability to deliver mobile broadband with greater data capacity and lower latency than previous generations of cellular networks). Despite its wide acceptance, LTE alone may not be sufficient to meet the ever-increasing demand of data traffic, and operators are always seeking to improve network coverage and the end-user experience. For example, operators are rolling out wireless fidelity (Wi-Fi) access points or hotspots to supplement LTE access. These Wi-Fi access points allow the user to access data services over Wi-Fi access, which eases the "stress" on LTE network resources. Because there is no circuit-switched (CS) voice domain in LTE, the mobile industry has adopted a globally interoperable Internet protocol (IP)-based voice and video calling solution for LTE, known as voice over LTE (VoLTE), which has enabled development of new innovative communication services, such as voice over Wi-Fi (VoWiFi) calling. It is noted that these LTE data access services, such as VoLTE and Vo-WiFi services, are different from operator-provided voice services. With combined VoWiFi/cellular services and seamless roaming between those two networks, subscribers are able to use voice over a Wi-Fi network, where available, and cellular connections where Wi-Fi is missing or where the user is outside of a Wi-Fi coverage area. Coupling VoWiFi service capabilities with cellular services shows great potential with respect to reducing the cost of voice services, in particular for roaming and for access to broadband services, while also increasing the convenience to users. Deploying Wi-Fi access points and services also enables operators to improve network coverage in indoor and rural areas in a cost effective manner.

With the ever increasing deployment and ability to use alternative networks such as Wi-Fi networks and cellular networks for the communication of voice and/or data, there is a need for improved methods, apparatus and/or systems to provide packet switched-to-packet switched access network (PS-to-PS) handovers. There is also a need to reduce or avoid excessive network loading, bandwidth usage and/or use of network resources including communications resources associated with signaling for handovers and/or handover related signaling including registration related signaling. There is a need to optimize PS-to-PS handover operations to eliminate call signaling steps and/or otherwise reduce or minimize control signaling overhead. There is a further need for PS-to-PS handover procedures that do not require the re-authorization of the user with core network. There is also a need for PS-to-PS handover procedures that reduce the amount of time required to complete handovers and improve the quality and continuity of voice data and/or other data during a communication associated with a voice call or a communication session. There is a need for handover procedures that do not require networks to support VoLTE so that handovers can be performed over a wider range of devices and networks than presently available handover procedures. There is a need for handover procedures which minimize changes to media paths utilized to provide the communications session, which can thereby improve the quality of the communication session (e.g., better voice continuity, no audio gaps). The various discussed needs relate to and/or are based on technical problems in the communications field. While there are many technical problems and needs discussed above, a system, method or apparatus which can address one or more of the needs and/or corresponding technical problems would be desirable.

BRIEF SUMMARY OF THE INVENTION

The present invention is directed to systems, methods, and computer-readable storage media adapted to provide improved handovers of communication sessions from a first access network to a second access network (e.g., handovers of communication sessions from a Wi-Fi network to a cellular network or from a cellular network to a Wi-Fi network). Embodiments of the present invention address one or more of the above discussed needs and/or corresponding technical problems. Various features of the present invention address the technological problems of how to optimize handovers to reduce network loading, bandwidth usage and/or use of network resources including communications resources associated with handovers. Various embodiments are flexible so that they do not require devices support VoLTE. At least some embodiments reduce the time it takes to complete a handover while improving on the quality and continuity of the communication session. At least some of the methods reduce signaling overhead as compared to known approaches thereby allowing for more efficient use of available resources, e.g., resources which can be used to communicate control and/or other messages. In operation according to embodiments, a user equipment (UE) may utilize a connection provided by a first access network (e.g., a Wi-Fi network or a cellular access network) to register with a core network (e.g., an IP multimedia subsystem (IMS) core network). Subsequently, the UE may establish a communication session with a remote UE, where the communication session is provided to the UE via the connection provided by the first access network. During the communication session, the UE may determine to handover the communication session to a second access network (e.g., a cellular access network or a Wi-Fi network) and may initiate operations to handover the communication session.

When a handover of the communication session involves a packet switched (PS)-to-PS access network handover, as may occur, for example, during a handover of a voice communication session from a Wi-Fi access network to an LTE access network or vice-versa, wireless communication specifications, such as technical specifications created by the 3rd Generation Partnership Project (3GPP), require that the UE perform a complete registration with the core network, which includes authentication of the user. For example, the technical specification 3GPP TS 24.237, V14.0.0 (2016-06), the contents of which are expressly incorporated herein by reference in their entirety, describes, at Section A.7.2, a procedure for performing a registration during a PS-to-PS handover which requires a complete registration (e.g., registration with user authentication) to be executed on the new target access, as described in more detail below with reference to FIG. 2. This handover procedure described in Section A.7.2 is time consuming, requiring a full registration of the UE (including authenticating the user) and also requiring re-invite signaling to be exchanged with the remote UE during the handover, and can cause the handover to take six to eight seconds to complete. Embodiments of the present disclosure provide optimizations for PS-to-PS handovers that utilize registration refreshing techniques to improve the handover operations and do not require re-invite signaling to be exchanged with the remote UE during the handover, thereby reducing the amount of time required to complete PS-to-PS handover of a communication session from a first access network to a second access network to between three and five seconds.

In an embodiment, in response refreshing the registration of the UE with the network, the UE may send an invite message to a network node to establish a new media path over the second access network. According to Section A.7.2 of the technical specification 3GPP TS 24.237, V14.0.0 (2016-06) creation of the new media path over the target access network (e.g., the access network to which the communication session is being handed over) involves sending an INVITE message to the core network which triggers a re-INVITE message to the remote UE, and the handover is performed in a make-before-break scenario where the UE requesting the handover maintains the connection over the old access network (e.g., the access network from which the communication session is being handed over) until the handover is complete (e.g., until the handover of the communication session to the target access network is complete). Embodiments of the present disclosure provide techniques for optimizing the INVITE procedure so that only the media path between the UE and the edge of the core network is modified, eliminating the need to modify the media path associated with the remote UE, and allowing the media path provided by the old access network (e.g., the media path from which the communication session is being handover over) to be torn down more quickly.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
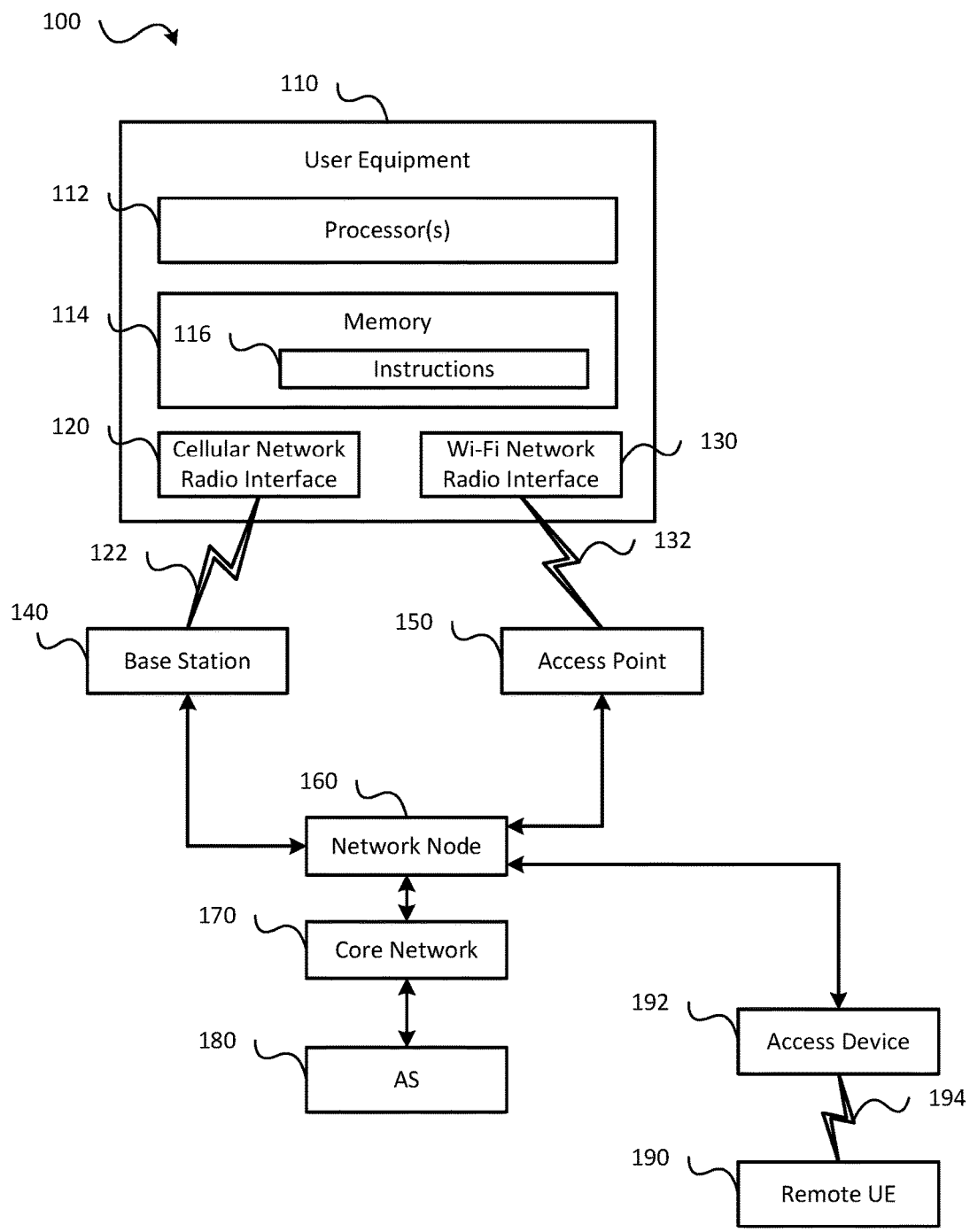
FIG. 1 is a block diagram of a system configured to utilize wireless communication links to provide communication services via one or more networks in accordance with one or more embodiments of the present disclosure.

Referring to FIG. 1, a block diagram of a system configured to utilize wireless communication links to provide communication services via one or more networks in accordance with one or more embodiments of the present disclosure is shown as a system 100. As shown in FIG. 1, the system 100 includes a base station 140, an access point 150, a network node 160, and a core network 170. The access point 150 may operate as part of a first access network to provide the UE 110 with access to communication services (e.g., voice and data services) provided by the core network 170. In an embodiment, the first access network associated with the base station 140 may be a cellular access network, such as a long term evolution (LTE)/4$^{th}$ Generation (4G) network, an evolved high speed packet access (HSPA+) network, and the like, and the core network 170 may be an IMS core network. In this embodiment, the base station 140 may be an evolved Node B (eNodeB), a picocell, a femtocell, and the like. Similarly, the access point 150 may operate as part of a second access network to provide the UE 110 with access to communication services (e.g., voice and data services) provided by the core network 170. In an embodiment, the second access network associated with the access point 150 may be a wireless fidelity (Wi-Fi) network, and the core network 170 may be an IMS core network. In this embodiment, the access point 150 may be an access point operating in accordance with a Wi-Fi protocol, such as an Institute of Electronics and Electrical Engineers (IEEE) 802.11 protocol. In an embodiment, the access point 150 may be operated by an entity that operates the first access network and the core network 170. For example, the access point 150 may be deployed as a wireless hotspot to provide additional coverage in locations where the first access network has a weak signal or no signal, such as in various indoor locations. In an additional or alternative embodiment, the access point 150 may be an access point owned by the user of the UE 110, such as a personal access point providing wireless Internet connectivity in the user's home.

As shown in FIG. 1, the UE 110 includes one or more processors 112, a memory 114, a plurality of radio access technologies (RATs) including a cellular network radio interface 120 and a Wi-Fi network radio interface 130. As it will be appreciated the RAT interfaces include receivers and transmitters. The cellular network radio interface 120 may enable the UE 110 to establish a connection 122 to the base station 140, and the Wi-Fi network radio interface 130 may enable the UE 110 to establish a connection 132 to the access point 150. It is noted that cellular network radio interface 120 and the Wi-Fi network radio interface 130 are provided for purposes of illustration, rather than by way of limitation, and that the UE 110 of embodiments may include other RATs, such as a Bluetooth radio interface, and the like. In an embodiment, the UE 110 may comprise any of various device configurations, such as a personal computer, a smart phone, a personal digital assistant (PDA), a tablet device, etc. Although the UE 110 may be provided in many such configurations, embodiments will be described herein with reference to a smart phone configuration of the UE 110 to provide an example to aid in understanding the concepts herein. In an embodiment, operations of the UE 110 may be performed by the one or more processors 112 by executing instructions stored in the memory 114, such as the instructions 116. In an embodiment, the instructions 116 may be provided as part of an over the top (OTT) application installed on the UE 110. The OTT application may enable legacy UEs to access services and functionality, such as Internet protocol (IP) voice and other packet switched (PS) services provided by cellular networks (e.g., LTE/4G and next generation cellular networks). In an additional or alternative embodiment, the instructions 116 may be provided as original equipment manufacturer (OEM) software provided with the UE 110 when purchased or otherwise acquired by a user.

The network node 160 may operate as an intermediary between the first and second access networks and the core network 170. In an embodiment, the network node 160 may be a session border controller/proxy-call session control function (SBC/P-CSCF) operating at the edge of the core network 170. The SBC/P-CSCF also referred to as an Access SBC/P-CSCF being a device that combines the features and functionality of a session border controller with a proxy-call session control function. The network node 160 may be configured to exchange signaling information between devices, such as the UE 110, and the core network. For example, the network node 160 may be configured to exchange session initiation protocol (SIP) messages between the UE 110 and the core network 170. The SIP messages may be used to establish communication sessions (e.g., voice communication sessions) between the UE 110 and other devices, such as the remote UE 190, as described in more detail below.

During operation, the UE 110 may initially register with the core network 170 using a first access network (e.g., a cellular access network provided by the base station 140 or a Wi-Fi access network provided by the access point 150). For example, if the user of the UE 110 powers on the UE 110 indoors, the UE 110 may not be able to obtain a signal from the base station 140 that is suitable for one or more types of services, such as voice and/or data services, and may register the UE 110 with the core network 170 via a connection 132 to the access point 150. In an embodiment, the registration is performed by sending a register message to the network node 160. The network node 160, upon receiving the register message from the UE 110, may initiate operations to register the UE 110 with the core network 170. Because the registration is an initial registration (i.e., the UE 110 is not registered with the core network 170 at the time the register message is received), the operations to register the UE 110 with the core network 170 may be a "full registration" that includes performing authorization of the user. In an embodiment, various components of the core network 170 (not shown in FIG. 1) may be involved in the "full registration." For example, as shown in FIG. 1, the full registration may include registration of the UE 110 with an application server (AS) 180 of the core network 170. In some embodiments, the application server 180 is implemented as a virtual mobile core application server. In some other embodiments, the core network 170 may not include the AS 180, and the registration of the UE 110 with the core network 170 may involve other components (not shown in FIG. 1) of the core network 170, such as an authentication, authorization, and accounting (AAA) server, a service centralization and continuity application server (SCC-AS), a home subscriber server (HSS), a telephony application server, and the like.

In an embodiment, transport layer security/secure real-time transport protocol (TLS/SRTP) is utilized to provide secure connections to the network node 160 via the access networks provided by the base station 140 and the access point 150. In such embodiments, a TLS setup procedure may be executed prior to transmission of the register message to the network node 160. It is noted that in other embodiments, other security protocols and techniques, such as IP Security (IPSEC), may be used to provide secure sessions/connections depending on a configuration of the devices and networks providing or using the network connections and services.

Subsequent to performing the "full" registration of the UE 110 with the core network 170, the UE 110 may establish a communication session between the UE and a remote UE 190. As shown in FIG. 1, the remote UE 190 may be connected to an access device 192 via a connection 194. In an embodiment, the access device 192 may be an access point (e.g., a Wi-Fi access point similar to the access point 150). In an additional or alternative embodiment, the access device 192 may be a cellular base station (e.g., a base station similar to the base station 140). The communication session may be provided via a serving leg and a remote leg, each of these legs being associated with a media path (e.g., a path for transporting voice or other data between a UE and the core network during the communication session) and a signaling path (e.g., a path for exchanging signaling information between the UE and the core network during the communication session). For example, the serving leg may be associated with a first media path and a first signaling path that provide the communication session to the UE 110, and the remote leg may be associated with a second media path and a second signaling path that are used to provide the communication session to the remote UE 190. In an embodiment, the serving leg and the remote leg for the communication session may be terminated at the network node 160. In this example the serving leg may be provided, at least in part, by the communication link 132 between the UE 110 and the access point 150. However, in other examples the serving leg may be provided, at least in part, by a connection 122 between the UE 110 and the base station 140 depending on the access network utilized to initially register the UE 110 with the core network 170.

During the communication session, the UE 110 may periodically monitor one of more characteristics of the communication link between the UE 110 and the "active" access network to determine whether the one or more monitored characteristics satisfy a threshold value. In an embodiment, different threshold values may be configured for each of the one or more characteristics. In this example, the "active" access network is the Wi-Fi network provided by the access point 150 (e.g., because the UE 110 initially registered with the core network 170 via the Wi-Fi access network). However, in other examples, the "active" access network may be a cellular access network, such as the cellular access network provided by the base station 140. In an embodiment, the one or more characteristics of the communication link may include a received signal strength indication (RSSI) associated with the "active" access network, which in this example is the Wi-Fi network provided by the access point 150, a bit error rate (BER) associated with the "active" access network, a link quality indicator (LQI) associated with the "active" access network, a data rate provided via the communication link, a signal to noise ratio (SNR) associated with the communication link, or a combination thereof. In an embodiment, the threshold value may be a value representative of characteristic that indicates the communication link provides a minimum quality of service (QoS) (e.g., a minimum SNR value, a maximum BER, a minimum RSSI value, a minimum data rate, etc.) with respect to a communication session (e.g., a voice or data session). In an embodiment, the threshold value for each of the one or more characteristics may be configurable.

In an embodiment, one or more threshold values may be selected from a plurality of threshold values for use by the UE 110. For example, a first threshold value may be associated with a maximum BER, a second threshold value may be associated with a minimum SNR, a third threshold value may be associated with a minimum data rate, a fourth threshold value may be associated with a minimum RSSI, etc., and the UE 110 may monitor each of the one or more characteristics of the communication link to determine whether each of the one or more characteristics satisfies a corresponding threshold value. For example, a multimedia streaming session (e.g., a video or multimedia call, a video streaming session, a music streaming session, a video chat session, etc.) may require a minimum data rate to provide the user of the UE 110 with an acceptable user experience (e.g., good picture quality, sound quality, etc.), while a VoWiFi or VoIP session (e.g., a voice communication session) may require the same or different threshold characteristics to provide an acceptable user experience (e.g., good voice continuity, etc.). Thus, in an embodiment, the UE 110 may determine the one or more characteristics to monitor during the session based on a type of the session (e.g., whether the session is a VoWiFi call, a multimedia streaming session, etc.), and may determine a set of one or more threshold values corresponding to the one or more monitored characteristics. In an embodiment, the threshold value(s) associated with a particular type of session, and the threshold value(s) associated with each threshold may be configurable.

The UE 110 may determine, based on the one or more monitored characteristics and the one or more threshold values, whether to handover the communication session. In an embodiment, the UE 110 may determine, based on the one or more monitored characteristics and the one or more threshold values, to handover the communication session to a different access network, such as the cellular access network provided by the base station 140. In an embodiment, upon establishing the connection to the core network 170 via the connection to the access point 150, the UE 110 may place the cellular network radio interface 120 in an off (e.g., no operational power) state or a low-power state (e.g., a state where the cellular network radio interface 120 periodically receives signals from the base station 140, such as pilot signals or other signals that may be used to determine one or more characteristics representative of the signal quality of the base station 140). In an embodiment, the UE 110 may store (e.g., in the memory 114) information representative of a characteristic of a previous connection between the UE 110 and the base station 140, and may use that information to determine whether the characteristic satisfies a threshold. For example, the UE 110 may periodically store information representative of one or more characteristics of a previous or existing connection between the UE 110 and an access network (e.g., the networks provided by the base station 140 and/or the access point 150) at the memory 114 of the UE 110. When the UE 110 determines that a communication session (e.g., a Wi-Fi voice communication session) provided via the connection to the access point 150 is at risk of being dropped (e.g., the one or more characteristics do not satisfy the threshold values), as described above, the UE 110 may access the stored information and determine whether to activate the cellular network radio interface 120 (e.g., provide operational power to the cellular network radio interface 120 or transition the cellular network radio interface 120 from the low power state to a normal operational state) based on the stored information representative of the one or more characteristics of the previous connection to the base station 140. For example, when the information indicates that the characteristic of the previous connection between the UE 110 and the base station 140 provided a good connection (i.e., the current session would not be dropped if provided by a connection between the UE 110 and the base station 140 as indicated by the information), the UE 110 may activate the cellular network radio interface 120 and initiate operations to handover the communication session from the Wi-Fi access network to the cellular access network provided by the base station 140.

In an embodiment, upon activating the cellular network radio interface 120, the UE 110 may determine whether the cellular network (e.g., the base station 140 or another base station operating in the cellular access network) is available. Depending on the location of the UE 110, the UE 110 may or may not be within the coverage area of the cellular access network (e.g., a coverage area corresponding to the cellular network radio interface 120). If the UE 110 determines that the cellular access network is not available, the UE 110 may determine whether an alternative access point of the Wi-Fi access network is available. If the cellular access network is available (e.g., the UE 110 is within the coverage area of the base station 140), the UE 110 may initiate operations to connect to and handover the communication session between the UE 110 and the remote UE to the base station 140 in accordance with embodiments, as described in more detail below.

In an embodiment, the UE 110 may determine that both an alternative access point (e.g., an alternative Wi-Fi access point) and the base station 140 (or another base station of the cellular access network) are available, and may select one of the available access networks for handing over the connection. In an embodiment, selection of one of the available access networks may be determined based on one or more characteristics of the different available access networks. It is to be noted that although embodiments have been described as using a single threshold value (e.g., for one or more characteristics), in some embodiments, a two-tiered threshold may be used. For example, when a characteristic of the connection to the access point 150 fails to satisfy a threshold value of the two-tiered threshold, the UE 110 may activate the cellular network radio interface to determine whether the cellular access network is available, and when the characteristic of the connection to the access point 150 fails to satisfy a second threshold of the two-tiered threshold, the UE 110 may initiate the handover operations. In this example, the first threshold may be configured to allow sufficient time to identify the second network, and/or to acquire a connection to the second network prior to the communication session being dropped.

In response to a determination to handover the communication session, the UE 110 may initiate handover operations to handover the communication session to the selected access network. Regardless of the access network that is selected, the handover operations provide a PS-to-PS handover of the communication session. As explained briefly above, Section A.7.2 of the technical specification 3GPP TS 24.237, V14.0.0 (2016-06) provides for PS-to-PS handovers. Prior to describing the handover operations according to embodiments of the present application, a brief discussion of the PS-to-PS handover procedure detailed in Section A.7.2 of the technical specification 3GPP TS 24.237, V14.0.0 (2016-06) will be described to provide a better understanding of the optimizations and improvements provided by the handover operations performed according to embodiments of the present disclosure.

Figure 2:
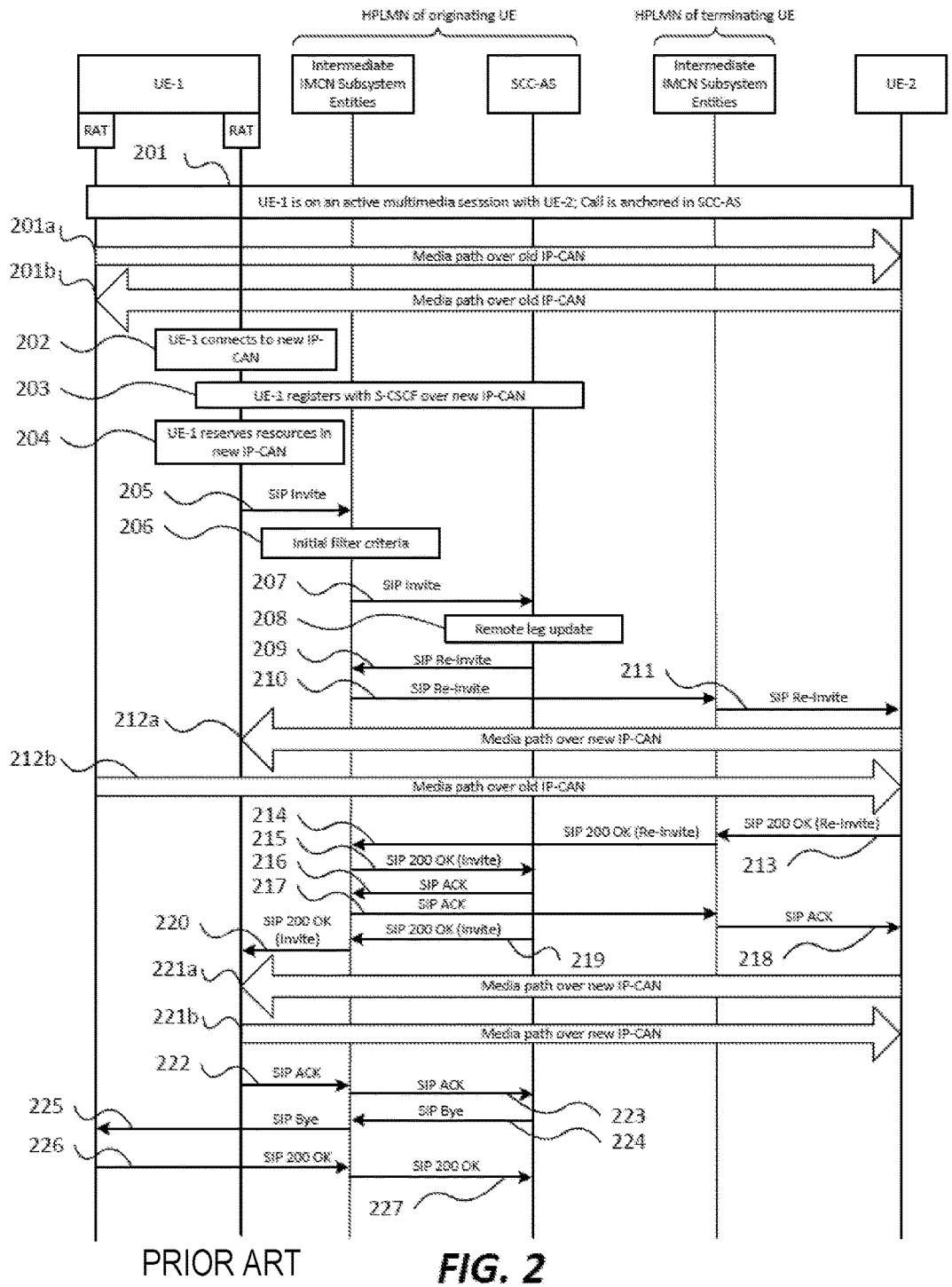
FIG. 2 is a ladder diagram illustrating a PS-to-PS handover procedure according to Section A.7.2 of the technical specification 3GPP TS 24.237, V14.0.0 (2016-06)

Referring to FIG. 2, a ladder diagram illustrating a PS-to-PS handover procedure according to Section A.7.2 of the technical specification 3GPP TS 24.237, V14.0.0 (2016-06) is shown. As shown in FIG. 2, a first UE (UE-1) may establish an active multimedia session, such as a voice call, with a second UE (UE-2) via a first RAT, as indicated at (201), where the call is anchored at an SCC-AS of a core network (e.g., an LTE/4G core network). Arrows labeled (201*a*) and (201*b*) illustrate the media paths between the first UE and the second UE, which are terminated at the first UE using a first RAT (e.g., a Wi-Fi network radio interface or a cellular network radio interface). When the first UE determines to handover the session, the first UE may connect to a new IP-connectivity access network (IP-CAN) that provides access to the core network, as indicated at (202), and may register with the SCC-AS of the core network, as indicated at (203). As shown in FIG. 2, the registration that occurs at (203) is a "full" registration, including authentication of the user, and is processed at the core network. Performing the "full" registration may require that the first UE and the IP multimedia core network (IMCN) subsystem support simultaneous multiple registrations and also may require the first UE to support dual mode operation. Also, the "new" or "full" registration may occur via a new P-CSCF.

At (204), the first UE reserves resources in the new IP-CAN and then, at (205), transmits a SIP INVITE message to an intermediate subsystem(s) of the IP multimedia core network (IMCN), such as a P-CSCF. The intermediate subsystem of the IMCN applies initial filter criteria, as indicated at (206), and then forwards the SIP INVITE message to the SCC-AS, at (207). As illustrated at (208)-(220) and briefly described above, when the SIP INVITE message is received at the intermediate subsystem of the IMCN, operations may be initiated to establish new media paths for both the first and second UEs. The establishment of the new media path for the second UE may involve sending a SIP Re-INVITE message to the second UE, as indicated at (208)-(214). Once the remote leg is updated based on the SIP Re-INVITE message, processing of the SIP INVITE message from the first UE may be completed to establish the new media path for the first UE, as indicated at (215)-(221*b*). As shown in FIG. 2, at the time the new media path indicated at 221*b* is established, the media path over the old IP-CAN remains, as indicated at (212*b*), and then, once the new media path has been established and the communication session has been handed over, the old media path may be torn down, as indicated at (222)-(227). As explained above, performing a "full" registration with the SCC-AS of the core network, including authentication of the user, and sending a SIP Re-INVITE message to the second UE are time consuming processes, and the call signaling flow illustrated in FIG. 2 can take between six and eight seconds to complete. Embodiments of the present disclosure eliminate many of these call signaling flow steps using optimization techniques that result in handover operations that can be completed in three to five seconds, resulting in improved handover performance, as described in more detail below.

Referring back to FIG. 1, during handover operations according to embodiments of the present disclosure, the UE 110 may transmit a register message to the network node 160. As briefly described above, at the time this register message is to be transmitted (e.g., in response to a determination to perform a handover operation with respect to an active communication session), the UE 110 has already performed a full registration with the core network 170, as described above. Thus, the register message transmitted during the handover operations may be configured to refresh the registration of the UE 110 with the core network 170. In an embodiment, the register message may be a SIP REGISTER message. In embodiments where the UE 110 is handing over a communication session established via the connection to access point 150, the register message transmitted during the handover operations may be transmitted to the network node 160 using the cellular network radio interface 120. In embodiments where the UE 110 is handing over a communication session established via the connection to the base station 140, the register message transmitted during the handover operations may be transmitted to the network node 160 using the Wi-Fi network radio interface 130. In an embodiment, the UE 110 transmits the register messages (e.g., both the register message initially registering the UE 110 with the core network 170 or the register message for handing over the communication session) to the same network node 160 (e.g., the Access-SBC/P-CSCF).

The register message transmitted by the UE 110 may include header information configured to serve as a trigger to the network node 160 currently serving the UE 110 that the registration of the UE 110 is to be refreshed with the core network 170, rather than a new or full registration request (e.g., a registration requiring authentication of the user/UE 110). The header information may include: a P-Access-Network-Info (PANI) field that identifies the target access network (e.g., the network to which the communication session is to be handed over); a From field including public user identity information having tag value that has been set to a new value generated by the UE 110; a To field including public user identity information that does not have a tag value; a Contact field that identifies the UE 110's IP address assigned over the target access network; a Call ID field having a tag value that has been set to a new tag value generated by the UE 110; and an Authorization header, which includes authentications credentials, nonce, and response fields already authentication by the core network 170. The trigger may include information associated with the established communication session over the serving access network, and the network node 160 may detect the trigger by determining, based on the information of the trigger, that the register message was received over an access network (e.g., a target access network) that is different from the serving access network that the UE 110 initially registered on. That is to say that the network node 160 may detect the trigger by identifying that the UE 110 has a valid registration with the core network 170 that was performed over the serving access network and that the register message was received from the UE 110 over a different access network (e.g., the target access network). In an embodiment, the trigger included in the header information of the register message may be provided by the Authorization header. For example, the Authorization header may be configured to mimic a SIP refresh registration header, thereby causing the network node 160 to refresh the registration, rather than implement a "full" registration. In an embodiment, configuring the Authorization header to provide the trigger may include populating the Authorization header with cached information associated with the communication session established over the serving access network (e.g., realm, nonce, algorithm, uniform resource indicator (URI), and response information obtained by the UE during establishment of the communication session, where nonce and response are not empty strings).

The network node 160 may receive the register message from the UE 110, and may detect the trigger that indicates that the network node 160 is to refresh the registration of the UE 110 with the core network (e.g., rather than perform a full registration of the UE including authentication of the user). Upon receiving the register message and detecting the trigger, the network node 160 may interwork the header information to produce an interworked register message, which may subsequently be provided to the core network 170 to refresh the registration of the UE 110 with the core network 170. In an embodiment, the network node 160 interworks the register message received from UE 110 by updating the Contact header field, the From header field, the To header field, and the Call ID field included in the register message. The tag value of the To field may be added to provide a tag value that points to the registration of the UE 110 over the serving access network. For example, the tag value for the To tag field may be added and may identify the registration of the UE over the Wi-Fi access network for Wi-Fi to cellular handovers (or the cellular access network for cellular to Wi-Fi handovers). The Contact field may be updated to point to an address (e.g., an IP address) of the network node 160. In an embodiment, the address of the network node may be appended to information included in the Contact field that was provided by the UE 110. For example, the Contact field may be of the format "user@address," and the UE 110 may provide the "user" portion of the Contact field, and the network node 160 may interwork the Contact field to provide the "address" portion such that the "address" points to the network node 160. The Call ID field may be updated by the network node to point to the registration of the UE 110 with the core network on the serving access network. The tag value of the From field may be updated to provide a tag value that points to the registration of the UE 110 over the serving access network. The Authorization header generated by UE is included in the interworked register message and is not changed by the network node 160. After the interworking is completed, the interworked register message may facilitate the refreshing of the registration of the UE 110 over the cellular access network (e.g., for Wi-Fi to cellular handovers), and may be transmitted to a registration node (not shown in FIG. 1) of the core network 170 to refresh the registration of the UE 110. In embodiments, because the registration of the UE 110 is simply refreshed during handover operations, rather than being handled as a new or full registration, the UE may not be re-authenticated with the core network 170 during the refreshing of the registration of the UE 110 (i.e., during the handover operations). In an embodiment, the network node 160 may check cached information stored at a memory of the network node 160 to verify that the UE 110 was previously registered with the core network 170 prior to interworking the register message. This may prevent the network node 160 from mishandling register messages (e.g., treating initial registrations of the UE 110 as requests to refresh the registration during a handover operation). In an embodiment, a TLS setup may take place over the new access network (e.g., the target access network) prior to transmitting the register message, as described in more detail with reference to FIGS. 4 and 6.

In an embodiment, if the refresh of the UE 110's registration with the core network 170 fails, the UE 110 and/or the network node 160 may initiate operations to perform a "full" registration of the UE 110 with the core network 170, including authentication of the user/UE 110. In additional or alternative embodiments, if the refresh of the UE 110's registration with the core network 170 fails, the system 100 may continue to try and refresh the registration until the refresh is successful. In still another additional or alternative embodiment, if the refresh of the UE 110's registration with the core network 170 fails, the system 100 may attempt to refresh the registration a threshold number of times, and, if the registration has not been successfully refreshed within the threshold number of attempts, the system 100 may implement operations to perform a full registration of the UE 110 with the core network 170.

In response to refreshing the registration of the UE 110 with the core network 170 to reflect the target access (e.g., target access via the cellular access network for Wi-Fi to cellular handovers or target access via the Wi-Fi access network for cellular to Wi-Fi handovers), the UE 110 may initiate handover operations to handover the communication session from the serving access to the target access. In an embodiment, the handover operations may include establishing a new media path between the UE 110 and the network node 160 (e.g., over the target access). In an embodiment, establishing the new media path over the target access may include transmitting, by the UE 110, an invite message (e.g., a SIP INVITE message) to the network node 160 using the connection established over the target access (e.g., the connection between the UE 110 and the base station 140 for Wi-Fi to cellular communication session handovers or the connection between the UE 110 and the access point 150 for cellular to Wi-Fi communication session handovers). In an embodiment, the invite message may include header information. The header information may include: a Request URI field including a session transfer number (STN) also known as and referred to as a session transfer identifier (STI) configured to serve as a trigger to the network node 160 that the invite message is associated with a handover of a communication session, rather than establishment of a new communication session (e.g., a new voice call); a From field configured by the UE 110 (e.g., Public User Identity of the UE 110 and including a tag set to new value generated by the UE 110); a To field (e.g., Public User Identity of the remote UE 190); a Contact field identifying the IP address assigned to the UE 110 over the target access (e.g., the IP address of the UE 110 on the cellular access network for handovers from the Wi-Fi network to the cellular network or the IP address of the UE 110 on the Wi-Fi access network for handovers from the cellular network to the Wi-Fi network); a Call ID field (e.g., set to new value generated by the UE 110); a PANI field that identifies the target access (e.g., the cellular access network for Wi-Fi to cellular handovers or the Wi-Fi access network for cellular to Wi-Fi handovers); and a Replaces field that: includes a Call ID set to the original call ID of the existing dialog on the serving access; includes a To-tag set to the To-tag of the existing dialog over the serving access; includes a From-tag set to the From-tag of the existing dialog over the serving access, which the UE 110 may obtain from information received from the network node 160 during setup of the communication session; and session description protocol (SDP) information that indicates the single Codec used for existing dialog over the serving access and other parameters (e.g., the SDP information may be provided as a series of parameters, such as: m=audio [port number] RTP/SAVP 0 (a new SRTP key used for secure access over the target access) a=crypto:1 AES_CM_128_HMAC_SHA1_80 inline: <key-∥salt>, where key∥salt is base64 encoded contacted master key and salt). It is noted that the specific parameters, information, and header fields identified above are provided for purposes of illustration, rather than by way of limitation, and that other header information and/or configurations may be utilized to establish a new media path for the handover of a communication session depending on a configuration of the network node 160, the core network 170, and/or the UE 110. Further, it is noted that the header field of the register message and the invite message include some of the same fields, however, these fields may have different values depending on whether they are included in the register message or the invite message.

The network node 160 may receive the invite message and use the information contained therein to identify the communication session (e.g., session information maintained in a memory of the network node 160) between the UE 110 and the remote UE, which may serve as a trigger to the network node 160 that causes the network node 160 to forego sending a re-invite message to the remote UE (e.g., the network node 160 maintains the same media path for the remote leg of the communication session during and after the handover of the media path of the UE 110 from the media path of the serving leg to the media path of the new serving leg established over the target access). In response to identifying that the invite message corresponds to the active communication session between the UE 110 and the remote UE, the network node 160 may open a new media port for use in handing over the communication session to the target access, and may transmit an acknowledgement message to the UE 110 to indicate the session is ready to be handed over (e.g., to the new media port opened by the network node 160). In an embodiment, the acknowledgement message transmitted to the UE 110 by the network node 160 in response to the invite message may be a SIP 200 OK message that includes the information that indicates to the UE 110 that the session is ready to be handed over (e.g., to the new media port opened by the network node 160). The information that indicates to the UE 110 that the session is ready to be handed over may include a plurality of header fields, such as: a Call ID field (e.g., set to the value generated by the UE 110 as included in the invite message); a From field (e.g., identifying the Public User Identity of the UE 110 and including a tag set to the new value generated by the UE 110 as included in the invite message); a To field (e.g., Public User Identity of the remote UE 190 and a tag value set to indicate that the remote leg for the communication session is terminated at the network node 160); a Contact field identifying the IP address of the network node 160; and SDP information that indicates the Codec used after the handover is the same as the existing dialog over the serving access and other parameters, such as the new media port opened by the network node 160 in response to receiving the invite message.

In response to receiving the acknowledgement message, the UE 110 may transmit another acknowledgement message to the network node 160 to acknowledge receipt of the new media port. In an embodiment, the UE 110 may transmit the acknowledgement message to the network node 160. The network node 160 may then transmit a teardown message to the UE 110 to clear the old media path (e.g., the media path utilized for the communication session prior to the handover of the communication session to the new media path). In an embodiment, the teardown message transmitted to the UE 110 may be a SIP BYE message configured based on the replaces header field of the invite message transmitted to the network node 160 by the UE 110, and may be transmitted on the old media path (e.g., the media path provided via the connection to the access point 150 for Wi-Fi to cellular handovers or the media path provided via the connection to the base station 140 for cellular to Wi-Fi handovers). Upon receiving the teardown message, the UE 110 may transmit an acknowledgement to the network node 160 over the old media path to complete the teardown of the old media path. After the handover of the communication session to the new media path, the new serving leg for the communication session may be provided over the target access (e.g., via a connection to the base station 140 for Wi-Fi to cellular handovers or via a connection to the access point 150 for cellular to Wi-Fi handovers).

From the foregoing it can be seen that the handover procedure of embodiments does not require the UE 110 to perform a full registration with the core network 170, and instead, merely refreshes the registration. This reduces the time required to complete the registration of the UE 110 on the target access network, allowing the handover to be executed sooner in the process than would otherwise be permitted (e.g., by the handover process illustrated in FIG. 2). Additionally, it can be seen from the foregoing that after the registration, the transmission of the invite message to the network node 160 does not trigger a Re-INVITE message to the remote UE 190, and instead simply moves the serving leg from the old media path to a new media path established over the target access network. Eliminating the Re-INVITE message flow may further optimize the handover procedure and reduce the amount of time required to complete the handover operations. Further, eliminating the Re-INVITE message flow allows the media path between the network node and the remote UE 190 to be maintained throughout the handing over (e.g., the remote leg of the communication session is not altered during the handing over). In embodiments where TLS/SRTP are utilized to provide security for the communication session, the same security protocol may be utilized before and after handover. Further, use of TLS/

SRTP may enable embodiments of the present disclosure to be utilized with core networks that do not support VoLTE sessions, thereby increasing the versatility of the disclosed embodiments and allowing PS-to-PS communication session handovers to be performed on a wider range of devices and/or networks (e.g., networks providing only LTE data access). In contrast, the handover solution illustrated in FIG. 2 requires the operator's network to support VoLTE. Exemplary signaling flows illustrating additional aspects of embodiments for providing handover operations in accordance with aspects of the present disclosure are illustrated with reference to FIGS. 3-6 below.

Figure 3:
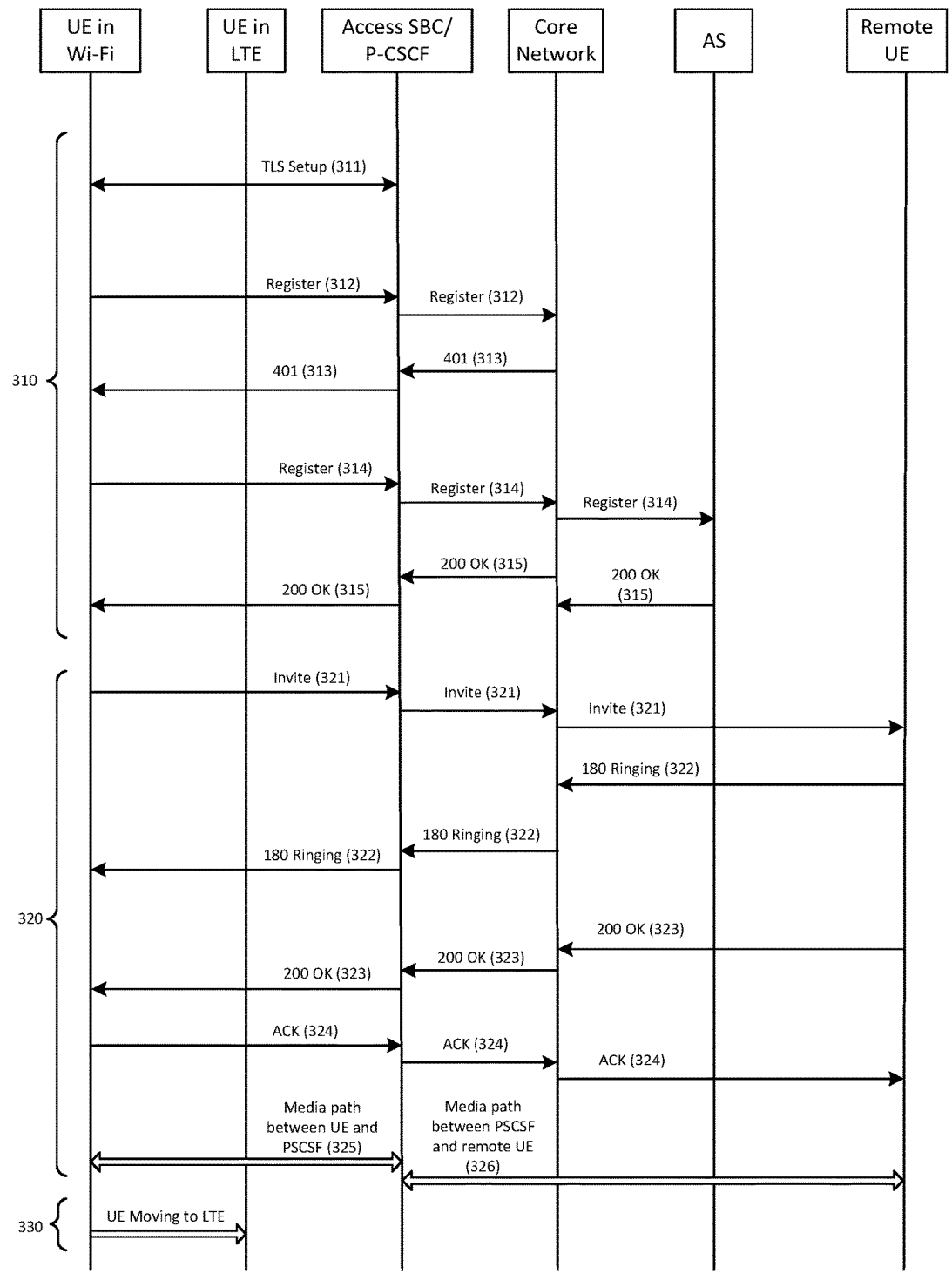
FIG. 3 is a ladder diagram of an exemplary signaling flow illustrating aspects of initial registration and call setup signaling according to embodiments of the present disclosure.

Referring to FIG. 3, a ladder diagram of an exemplary signaling flow illustrating aspects of initial registration and call setup signaling according to embodiments of the present disclosure is shown. In FIG. 3, signaling flow 310 illustrates aspects of a UE performing an initial registration with a core network via a connection to a Wi-Fi network and signaling flow 320 illustrates aspects of establishing a communication session over the connection to the Wi-Fi network. In an embodiment, the UE may be the UE 110 of FIG. 1, the network node may be the network node 160 of FIG. 1 (e.g., an Access-SBC/P-CSCF node operating at the edge of the core network), and the core network may be the core network 170 of FIG. 1. Initially, the UE establishes a connection with a Wi-Fi network and exchanges TLS setup information 311 with the network node. After performing the TLS setup, the UE may transmit a register message 312 to the network node to register the UE with the core network. Because the registration is an initial registration, the core network, or a registration component of the core network, such as the AS, may respond to the register message 312 with a SIP 401 message 313, where the SIP 401 message 313 indicates that the user/UE does not have a valid registration with the core network. In response to receiving the SIP 401 message 313, the UE may transmit a register message 314 to the network node. In an embodiment, the register message 314 may include authorization information that may be used to authenticate the user/UE with the core network. Upon successful registration of the user/UE with the core network (e.g., including registration of the UE with the application server (AS)), the network entities (e.g., the AS, the core network, and the access SBC/P-CSCF) may transmit a series of SIP 200 OK messages 315 acknowledging the successful registration of the user/UE with the core network. The AS may be, and in some embodiments is, the AS 180 illustrated in FIG. 1.

Upon completing the signaling flow 310, the UE can access services of the core network via the connection between the UE and a Wi-Fi network (e.g., via the connection 132 to the access point 150 of FIG. 1). For example, as illustrated by the signaling flow 320, upon completing the signaling flow 310, the UE may perform call setup operations to establish a communication session with a remote UE via the core network using the connection to the Wi-Fi network. As illustrated in FIG. 3, signaling flow 320 begins with the UE transmitting an invite message 321 to the remote UE via the network node (e.g., the access SBC/P-CSCF). The remote UE may respond to the invite message 321 by transmitting a SIP 180 Ringing message 322 back to the UE, and then subsequently transmitting a SIP 200 OK message 323 to the UE. The UE responds to the SIP 200 OK message 323 by transmitting an acknowledgement (ACK) message 324 to the remote UE. After this signaling exchange, the communication session for the call may be established and may include a serving leg that includes a media path 325 between the UE and the network node and a remote leg that includes a media path 326 between the network node and the remote UE. As illustrated in FIG. 3, in an embodiment, the serving and remote legs may terminate at the network node, which, as described above with reference to FIG. 1, may be an Access-SBC/P-CSCF operating between the core network and one or more access networks, such as a Wi-Fi access network and/or a cellular access network.

Figure 4:
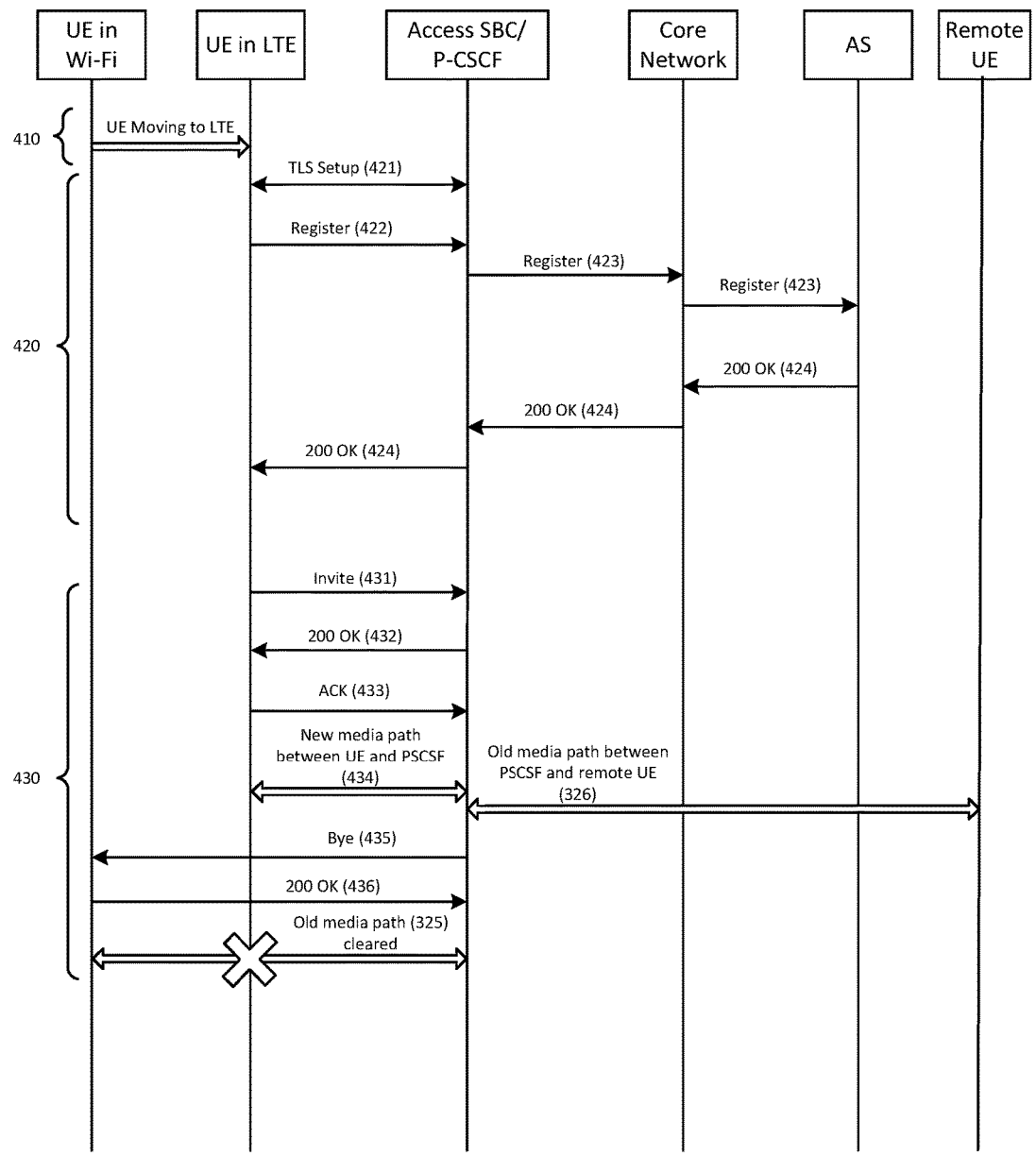
FIG. 4 is a ladder diagram of an exemplary signaling flow illustrating aspects of registration refresh and handover signaling flows according to embodiments of the present disclosure.

Subsequent to establishing the communication session between the UE and the remote UE while the UE is connected to the core network via Wi-Fi access, the UE may determine to handover the communication session to a cellular access network, as indicated in FIG. 3 at decision 330 and in FIG. 4 at 410. As explained above with reference to FIG. 1, when the UE determines to handover the communication session to a new access network (e.g., a target access network), the UE may initiate an optimized registration process that does not require re-authentication of the user with the core network, and may initiate an optimized handover/invite procedure that does not require transmission of a re-invite message to the remote UE. The optimized registration process performed during handover of a communication session according to embodiments is illustrated in FIG. 4 as a refresh registration signaling flow 420. As shown in FIG. 4, the refresh registration signaling flow 420 is performed over the target access (e.g., the access network to which the communication session is to be handed over), and begins with an exchange of TLS setup information 421 over the target access (e.g., cellular access). After the TLS setup is completed, the UE may transmit a register message 422 to the network node. As explained above with reference to FIG. 1, the register messages transmitted during refreshing of the registration according to embodiments may be configured to trigger a refreshing of the registration of the UE with the core network, rather than a "full" registration including authentication of the user/UE with the core network.

To facilitate the refreshing of the registration, the network node, upon receiving the register message 422 may interwork the register message 422 to produce an interworked register message 423 that may be provided to the core network to refresh the registration of the UE with the core network without requiring authentication of the user/UE. In an embodiment, the interworking may be performed by the network node based at least in part on information associated with the initial registration of the UE and/or the communication session established by the UE over the Wi-Fi access, which may be stored at a memory of the network node, as described above with reference to FIG. 1. Because the UE has a valid registration with the core network (e.g., from the initial registration), the core network may not challenge the authentication of the user/UE, and may instead transmit a SIP 200 OK message 424 indicating that the registration was successful to the UE. At the end of the refresh registration signaling flow 420 the UE's registration with the core network may be refreshed over the target access (e.g., the cellular access).

An optimized invite signaling flow according to embodiments may then be performed to handover the communication session to the target access network, as illustrated by handover invite signaling flow 430. The handover invite signaling flow 430 may begin with the UE transmitting an invite message 431 to the network node over the target access. As explained above with reference to FIG. 1, the invite message 431 may include a trigger that indicates to the network node that the invite message 431 is for a handover of an existing communication session, rather than a new communication session. In response to receiving the invite message 431, the network node may open a new media port for providing the communication session over the target access, and may transmit a SIP 200 OK message 432 to the UE. As explained above with reference to FIG. 1, the SIP 200 OK message 432 may include information that identifies one or more parameters for the communication session handover, such as a parameter identifying the new media port opened by the network node and other parameters for handing over the communication session. The UE may transmit an ACK message 433 acknowledging the receipt of the information that identifies the new port and may handover the communication session to the new media path 434 between the UE and the network node. In response to the ACK message 433, the network node may transmit a bye message 435 to the UE over the Wi-Fi access indicating that the communication session over the old serving leg (e.g., the old media path 325 of FIG. 3) is terminated (e.g., because the communication session has been handed over at the network node to the target access), and the UE may transmit a SIP 200 OK message 436 to the network node over the Wi-Fi indicating that the handover was successful. As shown in FIG. 4, the optimized handover invite signaling flow 430 does not require a re-invite to the remote UE and utilizes the same remote leg (including the media path 326) for the communication session before and after the handover operations. From the foregoing it is seen that handover registration and invite procedures/signaling flows implemented according to embodiments of the present disclosure provide optimizations for Wi-Fi to cellular handovers, which may reduce the amount of time required to complete the handovers and improve the quality and continuity of voice data during a communication session associated with a voice call. Further, as explained above with reference to FIG. 1, the signaling flows of embodiments do not require networks to support VoLTE. Thus, signaling flows according to embodiments of the present disclosure provide flexible technique for performing handovers across a wider range of devices and networks than presently available handover signaling flows, such as the exemplary signaling flow illustrated in FIG. 2.

Figure 5:
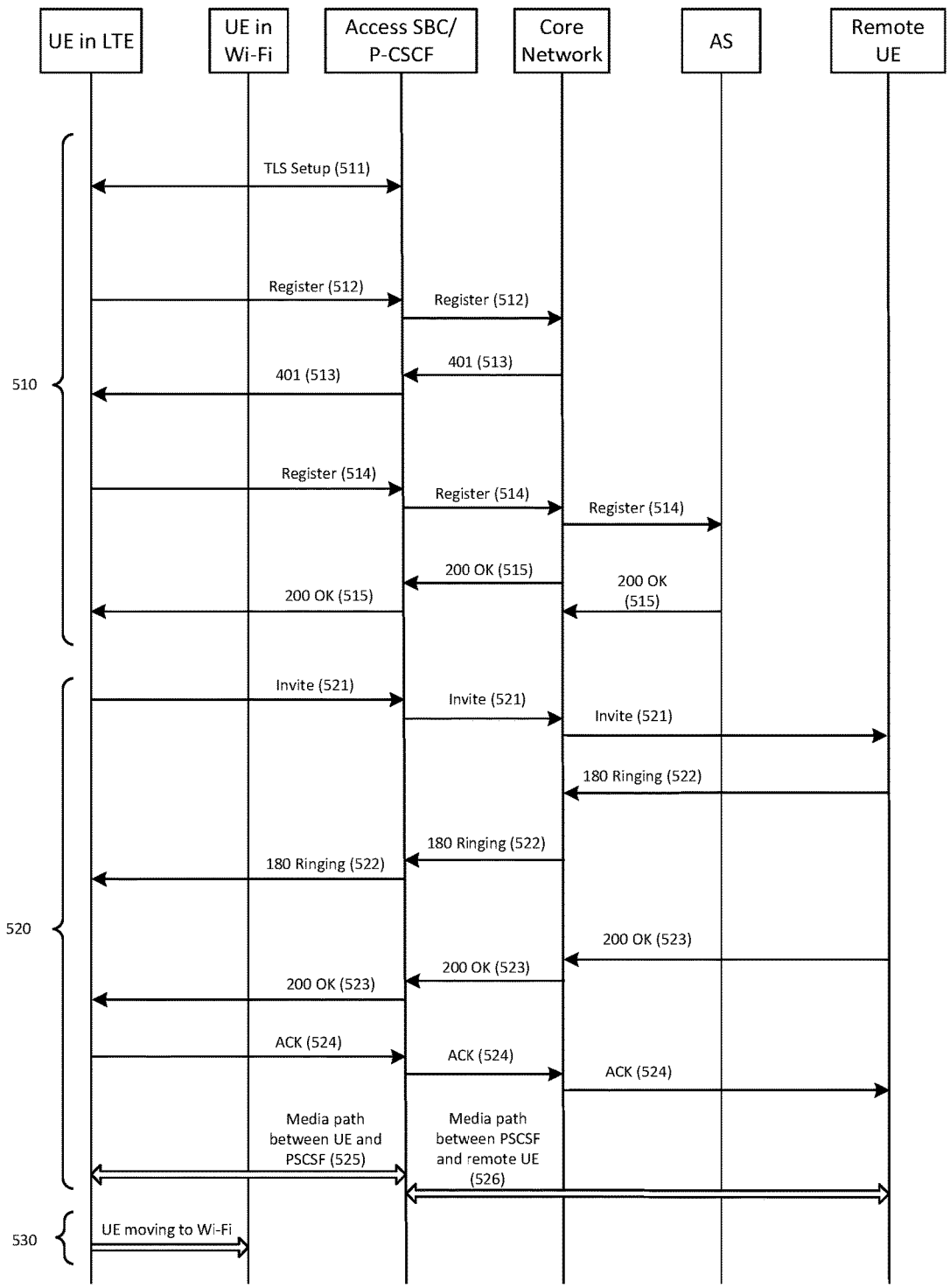
FIG. 5 is a ladder diagram of another exemplary signaling flow illustrating aspects of initial registration and call setup signaling according to embodiments of the present disclosure.

Referring to FIG. 5, a ladder diagram of another exemplary signaling flow illustrating aspects of initial registration and call setup signaling according to embodiments of the present disclosure is shown. In FIG. 5, the signaling flow 510 illustrates aspects of a UE performing an initial registration with a core network via a connection to a cellular network, such as an LTE network, and the signaling flow 520 illustrates aspects of establishing a communication session over the connection to the cellular network. In an embodiment, the UE may be the UE 110 of FIG. 1, the network node may be the network node 160 of FIG. 1 (e.g., an Access-SBC/P-CSCF node operating at the edge of the core network), and the core network may be the core network 170 of FIG. 1. Initially, the UE establishes a connection with a cellular network and exchanges TLS setup information 511 with the network node. After performing the TLS setup, the UE may transmit a register message 512 to the network node to register the UE with the core network. Because the registration is an initial registration, the core network, or a registration component of the core network, such as the AS, may respond to the register message 512 with a SIP 401 message 513, where the SIP 401 message 513 indicates that the user/UE does not have a valid registration with the core network. In response to receiving the SIP 401 message 513, the UE may transmit a register message 514 to the network node. In an embodiment, the register message 514 may include authorization information that may be used to authenticate the user/UE with the core network. Upon successful registration of the user/UE with the core network (e.g., including registration of the UE with the application server (AS)), the network entities (e.g., the AS, the core network, and the access SBC/P-CSCF) may transmit SIP 200 OK messages 515 acknowledging the successful registration of the user/UE with the core network. In an embodiment, the AS may be AS 180 of FIG. 1.

Upon completing the signaling flow 510, the UE can access services of the core network via the connection between the UE and a cellular network (e.g., via the connection 122 to the base station 140 of FIG. 1). For example, as illustrated by the signaling flow 520, upon completing the signaling flow 510, the UE may perform call setup operations to establish a communication session with a remote UE via the core network using the connection to the cellular network. As illustrated in FIG. 5, the signaling flow 520 begins with the UE transmitting an invite message 521 to the remote UE via the network node. The remote UE may respond to the invite message 521 by transmitting a SIP 180 Ringing message 522 back to the UE, and then subsequently transmitting a SIP 200 OK message 523 to the UE. The UE responds to the SIP 200 OK message 523 by transmitting an acknowledgement (ACK) message 524 to the remote UE. After this sequence of signaling exchanges, the communication session for the call may be established and may include a serving leg that includes a media path 525 between the UE and the network node and a remote leg that includes a media path 526 between the network node and the remote UE. As illustrated in FIG. 5, the serving and remote legs may terminate at the network node, which, as described above with reference to FIG. 1, may be an Access-SBC/P-CSCF operating between the core network and one or more access networks, such as a Wi-Fi access network and/or a cellular access network.

Figure 6:
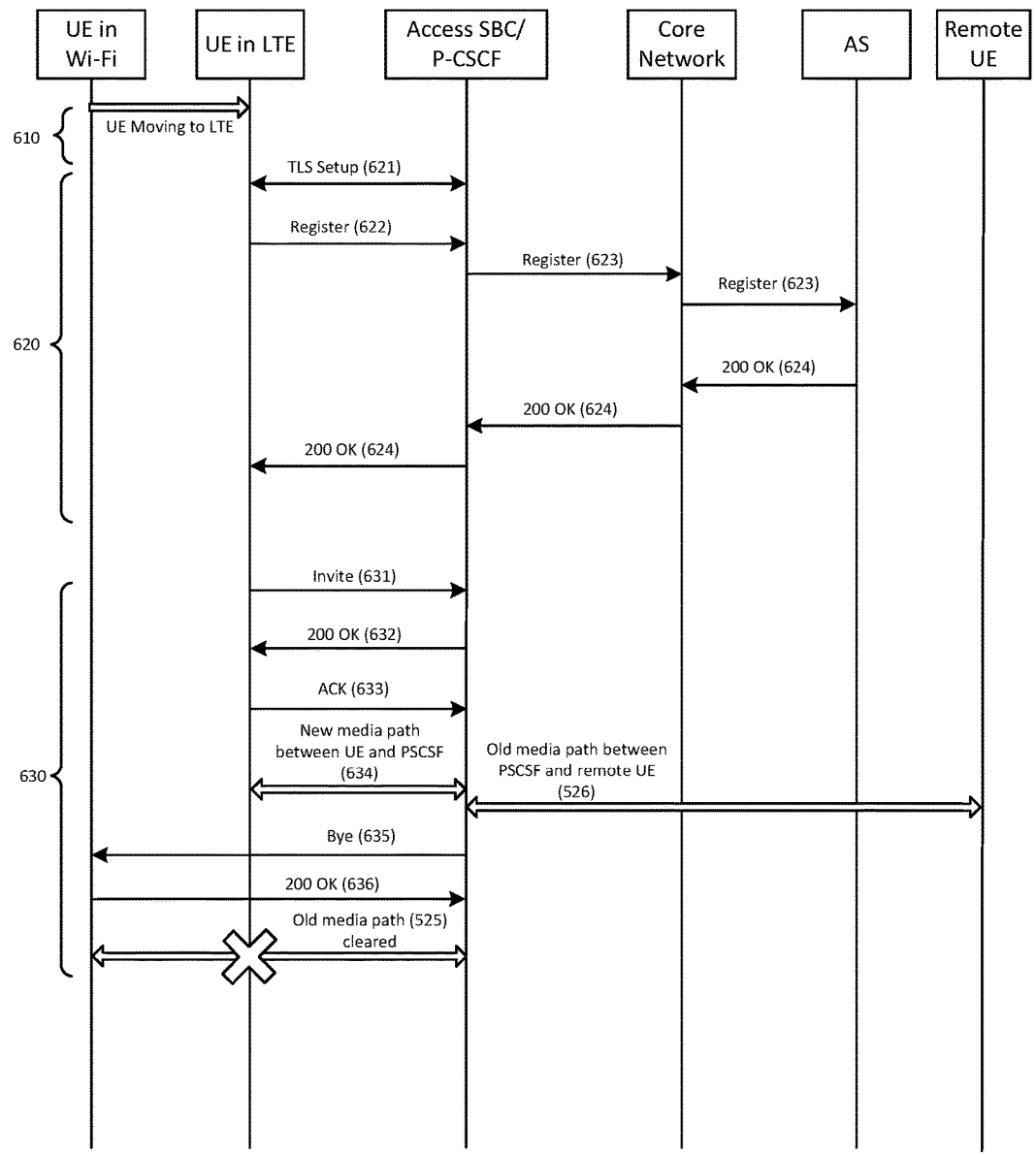
FIG. 6 is a ladder diagram of an exemplary signaling flow illustrating aspects of registration refresh and handover signaling flows according to embodiments of the present disclosure.

Subsequent to establishing the communication session between the UE and the remote UE while the UE is connected to the core network via cellular access, the UE may determine to handover the communication session to a Wi-Fi access network, as indicated in FIG. 5 at 530 and in FIG. 6 at 610. As explained above with reference to FIG. 1, when the UE determines to handover the communication session to a new serving access, the UE may initiate an optimized registration process that does not require re-authentication of the user with the core network, and may initiate an optimized handover/invite procedure that does not require transmission of a re-invite message to the remote UE or to a network node currently serving the UE (e.g., the remote UE 190 of FIG. 1) via an access network (e.g., an access network provided by the access device 192 of FIG. 1). The optimized registration process performed during handover of a communication session according to embodiments is illustrated in FIG. 6 as a refresh registration signaling flow 620. As shown in FIG. 6, the refresh registration signaling flow 620 is performed over the target access (e.g., the access network to which the communication session is to be handed over), and begins with an exchange of TLS setup information 621 over the target access (e.g., Wi-Fi access) to the same network node currently serving the UE (e.g., the network node serving the UE in FIGS. 5 and 6 may be the same Access-SBC/P-CSCF). After the TLS setup is completed, the UE may transmit a register message 622 to the network node. As explained above with reference to FIG. 1, the register messages transmitted during refreshing of the registration according to embodiments may be configured to trigger a refreshing of the registration of the UE with the core network, rather than a "full" registration including authentication of the user/UE with the core network.

To facilitate the refreshing of the registration, the network node, upon receiving the register message 622 may interwork the register message 622 to produce an interworked register message 623 that may be provided to the core network, e.g., an registrar of the core network, to refresh the registration of the UE with the core network without requiring authentication of the user/UE. In an embodiment, the interworking may be performed by the network node based at least in part on information associated with the initial registration of the UE and/or the communication session established by the UE over the Wi-Fi access, which may be stored at a memory of the network node, as described above with reference to FIG. 1. Because the UE has a valid registration with the core network (e.g., from the initial registration), the core network may not challenge the authentication of the user/UE, and may instead transmit a SIP 200 OK message 624 indicating that the registration was successful to the UE. For example, the registrar to which the register message was sent in the core network will not challenge the authentication of the user/UE and instead transmits a SIP 200 OK message 624 in response to the register message it receives. At the end of the refresh registration signaling flow 620 the UE's registration with the core network may be refreshed over the target access (e.g., the cellular access).

An optimized invite signaling flow according to embodiments may then be performed to handover the communication session to the target access network, as illustrated by handover invite signaling flow 630. As shown in FIG. 6, the handover invite signaling flow 630 may begin with the UE transmitting an invite message 631 to the network node over the target access. As explained above with reference to FIG. 1, the invite message 631 may include a trigger that indicates to the network node that the invite message 631 is for a handover of an existing communication session, rather than a new communication session. In response to receiving the invite message 631, the network node may open a new media port for providing the communication session over the target access, and may transmit a SIP 200 OK message 632 to the UE. As explained above with reference to FIG. 1, the SIP 200 OK 632 may include information that identifies one or more parameters for the communication session handover, such as a parameter identifying the new media port opened by the network node and other parameters for handing over the communication session. The UE may transmit an ACK message 633 acknowledging the receipt of the information that identifies the new port and may handover the communication session to the new media path 634 between the UE and the network node. In response to the ACK message 633, the network node may transmit a bye message 635 to the UE over the Wi-Fi access indicating that the communication session over the old serving leg (e.g., the old media path 525 of FIG. 5) is terminated (e.g., because the communication session has been handed over at the network node to the target access), and the UE may transmit a SIP 200 OK message 636 to the network node over the Wi-Fi indicating that the handover was successful. As shown in FIG. 6, the optimized handover invite signaling flow 630 does not require a re-invite to the remote UE and utilizes the same remote leg (including media path 526) for the communication session before and after the handover operations. From the foregoing it is seen that handover registration and invite procedures/signaling flows implemented according to embodiments of the present disclosure provide optimizations for cellular to Wi-Fi handovers, which may reduce the amount of time required to complete the handovers and improve the quality and continuity of voice data during a communication session associated with a voice call. Further, as explained above with reference to FIG. 1, the signaling flows of embodiments do not require networks to support VoLTE. Thus, signaling flows according to embodiments of the present disclosure provide flexible technique for performing handovers across a wider range of devices and networks than presently available handover signaling flows, such as the exemplary signaling flow illustrated in FIG. 2. Additionally, as shown in FIGS. 4 and 6, in embodiments, the UE performing handover operations may remain connected to the same Access-SCB/P-CSCF (e.g., the network node 160 of FIG. 1) despite handing over from the serving access network to a target access network. This may allow the UE to refresh the UE's registration with the core network, as described above with reference to FIGS. 1 and 3-6 (e.g., because the serving Access-SBC/P-CSCF has all of the information needed to interwork the register message stored at its memory), rather than performing a "full" registration. It is noted that where the UE utilizes a new Access-SBC/P-CSCF during the handover, the UE may need to perform a "full" registration via the new Access-SBC/P-CSCF (e.g., because the new Access-SBC/P-CSCF may not have the information needed to interwork the registration message stored in its memory).

Figure 7:
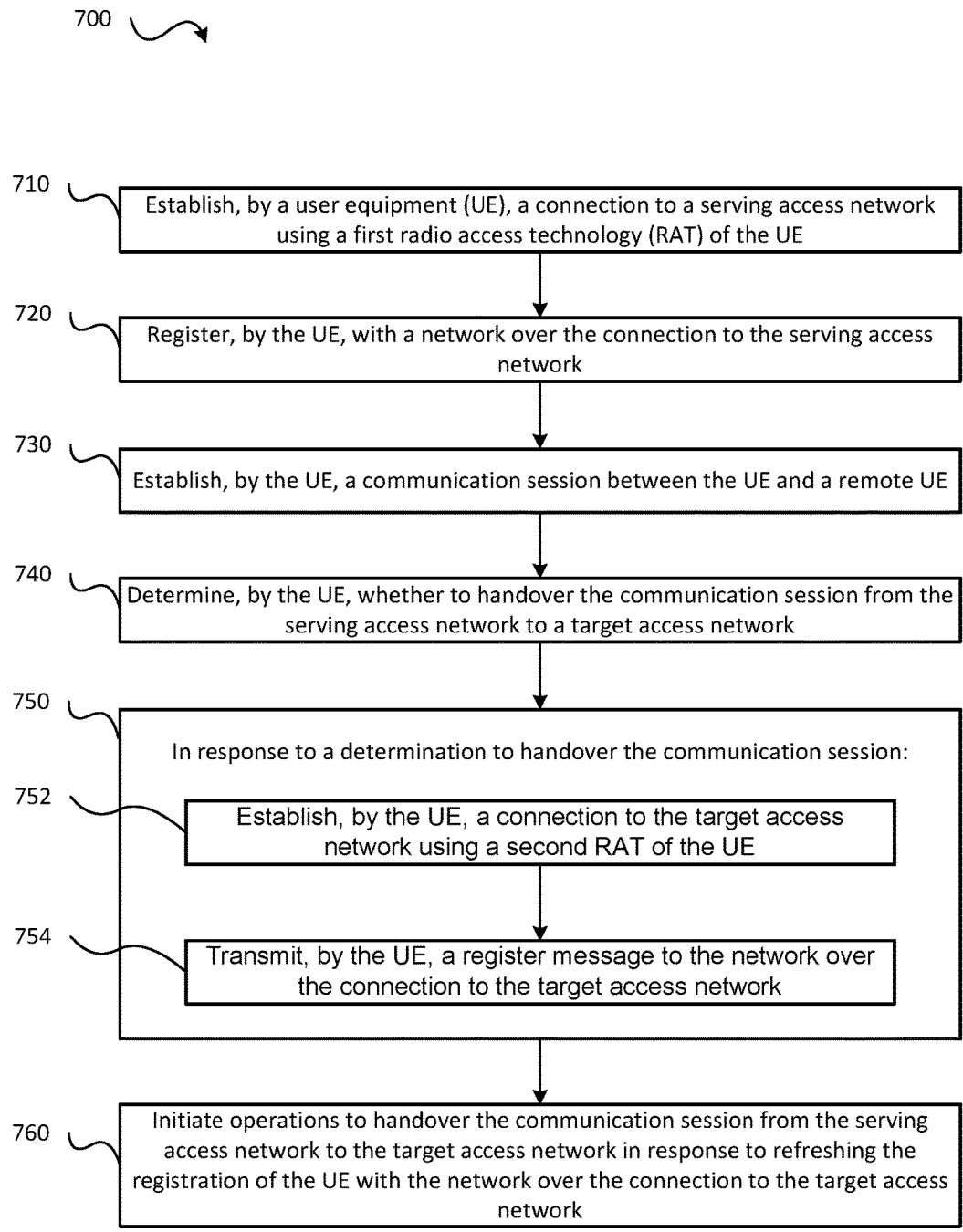
FIG. 7 is a flow diagram of an exemplary method for refreshing a registration of a user equipment (UE) and performing handover operations according to embodiments of the present disclosure.

Referring to FIG. 7, a flow diagram of an exemplary method for performing handover operations at a user equipment (UE) according to embodiments of the present disclosure is shown as a method 700. In an embodiment, the steps of the method 700 may be stored as instructions (e.g., the instructions 116 of FIG. 1) in a memory of the UE. At 710, the method 700 includes establishing, by a user equipment (UE), a connection to an access network using a first radio access technology (RAT) of the UE, and, at 720, registering, by the UE, with a network over the connection to the access network. In an embodiment, a transport layer security (TLS) setup procedure may be performed during establishment, at 710, of the connection to the access network. In an embodiment, the registration performed at 720 may be an initial registration, such as the registrations illustrated in the signaling flow 310 of FIG. 3 or the signaling flow 510 of FIG. 5, depending on whether the initial registration is performed over Wi-Fi access (e.g., signaling flow 310) or over cellular access (e.g., signaling flow 510).

At 730, the method 700 includes establishing, by the UE, a communication session between the UE and a remote UE. The communication session may be provided via a serving leg and a remote leg, where the serving leg includes a media path between the UE and the network node and the remote leg includes a media path between the network node and the remote UE. As noted above with reference to FIG. 1, the serving leg and the remote leg may also include signaling paths that are used to exchange signaling information between the UE and the network node and the remote UE and the network node, respectively. The serving leg of the communication session may be provided, at least in part, by the communication link established using the first RAT of the UE. In an embodiment, the communication session may be established using the signaling flow 320 of FIG. 3 or the signaling flow 520 of FIG. 5, depending on whether the communication session setup is performed over Wi-Fi access (e.g., signaling flow 320) or over cellular access (e.g., signaling flow 520).

At 740, the method 700 includes determining, by the UE, whether to handover the communication session from the access network to a target access network. As explained above with reference to FIG. 1, the determination to handover the communication session may be based on one or more characteristics of the connection between the UE and the serving access network for the communication session, such as whether one or more characteristics of the connection to the serving access network satisfy a threshold value(s). If the one or more characteristics indicate that the quality of the communication session is poor, degrading, or at risk of being dropped, the UE may determine to handover the communication session to another access network, such as a target access network, or, in some embodiments, another node in the same access network, as described above with reference to FIG. 1. In an embodiment, the determination to handover the communication session may correspond to elements 330/410 of FIGS. 3/4 (e.g., for Wi-Fi to cellular handovers), or the determination to handover the communication session may correspond to elements 530/610 of FIGS. 5/6 (e.g., for cellular to Wi-Fi handovers).

In response to a determination, at 750, to handover the communication session, the method 700 includes, at 752, establishing a connection to the target access network using a second radio access RAT of the UE, and, at 754, transmitting, by the UE, a register message to the network. The register message transmitted at 754 may be configured to cause the registration of the UE with the core network (e.g., the registration performed at 720) to be refreshed. At 760, the method 700 includes initiating operations to handover the communication session from the serving access network to the target access network in response to refreshing the registration of the UE with the network over the target access network. In an embodiment, the register message transmitted at 742 may be transmitted in accordance with the refresh registration signaling flow 420 of FIG. 4 (e.g., for Wi-Fi to cellular handovers), or transmitted in accordance with the refresh registration signaling flow 620 of FIG. 6 (e.g., for cellular to Wi-Fi handovers). In an embodiment, the operations to handover the communication session initiated at 760 may be performed in accordance with the handover invite signaling flow 430 of FIG. 4 (e.g., for Wi-Fi to cellular handovers), or performed in accordance with the handover invite signaling flow 630 of FIG. 6 (e.g., for cellular to Wi-Fi handovers). After the handover is complete, the communication session between the UE and the remote UE is provided via a new serving leg that includes a new media path between the network node and the UE, where at least a portion of the new media path of the new serving leg is provided via the target access network. As indicated above with reference to FIG. 1, the new serving leg may also include a signaling path for exchanging signaling information between the UE and the network node. As described above with reference to FIGS. 1 and 3-6, the handover operations may not require a "full" registration (e.g., registration requiring authentication of the user) with the network. Additionally, as described above with reference to FIGS. 1 and 3-6, the handover operations may not require a re-invite message to be transmitted to the remote UE. These optimizations may reduce the time required to complete the handover operations, resulting in improved voice quality and continuity for the communication session during the handover. Additionally, utilizing the network node to facilitate the handover operations may provide further performance improvements for the handover procedure. For example, latency may be reduced during the handover procedures because the network node, such as an access SBC/P-CSCF, is located closer to the UE than the core network. Additionally, as illustrated in FIGS. 3-6, and as described above with reference to FIG. 1, the handover operations do not alter the remote leg of the communication session (e.g., the re-invite procedure is eliminated), which minimizes changes to the media paths utilized to provide the communication session, which may improve the quality of the communication session (e.g., better voice continuity, no audio gap, etc.). Thus, the method 700 provides improved performance and optimization with respect to handover of a communication session from a first type of access to a second type of access.

Figure 8:
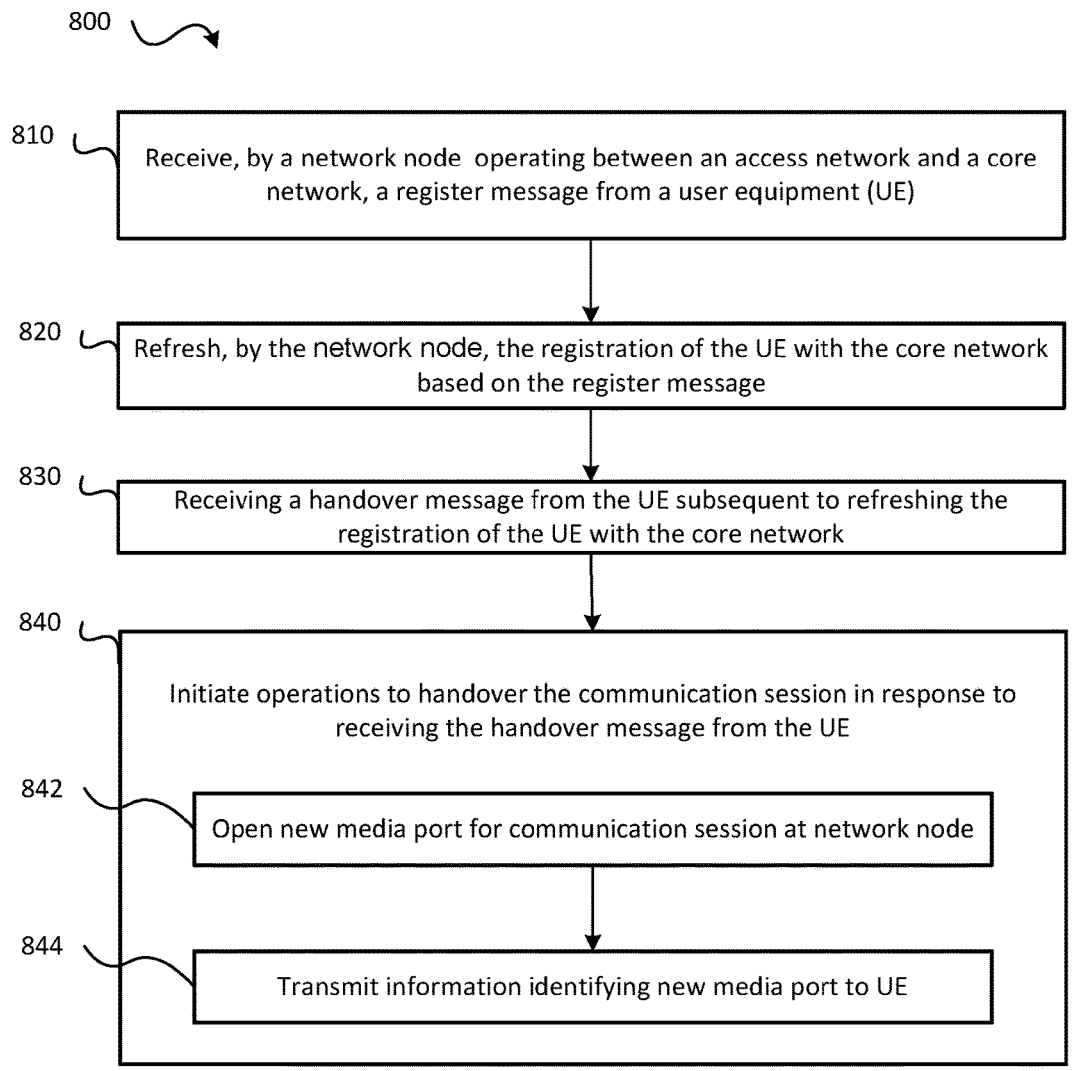
FIG. 8 is a flow diagram of an exemplary method for refreshing a registration of a user equipment (UE) and performing handover operations according to embodiments of the present disclosure.

Referring to FIG. 8, a flow diagram of an exemplary method for performing handover operations at a network node according to embodiments of the present disclosure is shown as a method 800. In an embodiment, the steps of the method 800 may be stored as instructions at a memory of the network node (e.g., the network node 160 of FIG. 1). In an embodiment, the network node may be an access SBC/P-CSCF operating as an intermediary between a core network (e.g., the core network 170 of FIG. 1) and one or more access networks (e.g., the access networks provided by the base station 140 and the access point 150 of FIG. 1). At 810, the method 800 includes receiving, by a network node operating between an access network and a core network, a register message from a user equipment (UE). The register message may be transmitted to the network node by the UE over a target access network subsequent to the UE establishing a communication session between the UE and a remote UE over a serving access network, where the communication session is provided via a serving leg and a remote leg, the serving leg comprising a media path and a signaling path between the UE and the network node and the remote leg comprising a media path and a signaling path between the network node and the remote UE. When the register message is received, at 810, the serving leg may be provided, at least in part, by a communication link established between the target access network and the UE. For example, in an embodiment, the register message may be received at the network node during execution of the refresh registration signaling flow 420 of FIG. 4 (e.g., for Wi-Fi to cellular handovers) or during execution of the handover signaling flow 620 of FIG. 6 (e.g., for cellular to Wi-Fi handovers).

At 820, the method 800 includes refreshing, by the network node, the registration of the UE with the core network based on the register message. As explained above with reference to FIGS. 1 and 3-6, the refreshing of the registration may not require authentication of the user/UE because the UE is already registered with the core network (e.g., the UE registered with the core network prior to establishing the communication session with the remote UE). At 830, the method 800 includes receiving a handover message from the UE subsequent to refreshing the registration of the UE with the core network. In an embodiment, the handover message may be an invite message, such as a SIP INVITE message, as described above with respect to FIGS. 1 and 3-6, and may be received as part of the handover invite signaling flow 430 of FIG. 4 (e.g., for Wi-Fi to cellular handovers) or as part of the handover invite signaling flow 630 of FIG. 6 (e.g., for cellular to Wi-Fi handovers). At 840, the method 800 may include initiating operations to handover the communication session in response to receiving the handover message from the UE. In an embodiment, the operations to handover the communication session may include, at 842, opening a new media port at the network node, and, at 844, transmitting information identifying the new media port to the UE. As explained above, after the handover, the communication session between the UE and the remote UE may be provided via a new serving leg comprising a new media path provided, at least in part, by a connection between the target access network and the UE. As described above with reference to FIGS. 1 and 3-6, handover operations performed according to the method 800 may not require a "full" registration (e.g., registration requiring authentication of the user) with the core network (e.g., the core network 170 of FIG. 1). Additionally, as described above with reference to FIGS. 1 and 3-6, the handover operations of the method 800 may not require a re-invite message to be transmitted to the remote UE (i.e., the remote leg for the communication session is not altered during the handover). These optimizations may reduce the time required to complete the handover operations. Additionally, utilizing the network node to facilitate the handover operations may provide further performance improvements for the handover procedure. For example, latency may be reduced during the handover procedures because the network node, such as an access SBC/P-CSCF, is located closer to the UE than the core network. Thus, the method 800 provides improved performance and optimization with respect to handover of a communication session from a first type of access (e.g., Wi-Fi access/cellular access) to a second type of access (e.g., cellular access/Wi-Fi access).

It should be appreciated that, although embodiments have been described herein with reference to handover of communication session, such as voice calls, the concepts herein are not limited to use with respect to voice communications sessions. For example, embodiments may be utilized with respect to PS-to-PS handovers of data communication sessions (e.g., multimedia streaming or downloading sessions for audio and/or video data, such as may be provided in connection with music and/or movie streaming applications executing on the UE, message session relay protocol (MSRP) sessions, and the like) in addition to voice communication sessions (e.g., communication sessions associated with a voice call). Further, embodiments may further facilitate multiple handovers during a single session in accordance with the disclosed embodiments. For example, a communication session established over Wi-Fi access may be handed over to cellular access as described with reference to FIG. 1 and as illustrated in FIGS. 3 and 4. If after the handover is completed, the cellular access becomes unsuitable for the communication session, the UE may determine if a Wi-Fi access is available and suitable for handing the communication session back over to the Wi-Fi access, and, if the Wi-Fi access is suitable, may implement operations to handover the communication session from cellular access back to Wi-Fi access using the techniques described above with reference to FIG. 1 and FIGS. 5 and 6. Embodiments of handover techniques may also find utility in handovers between different access networks of the same type, such as handovers from a first Wi-Fi access network to a second Wi-Fi access network, where the first and second Wi-Fi access networks are operated by different providers.

Figure 9:
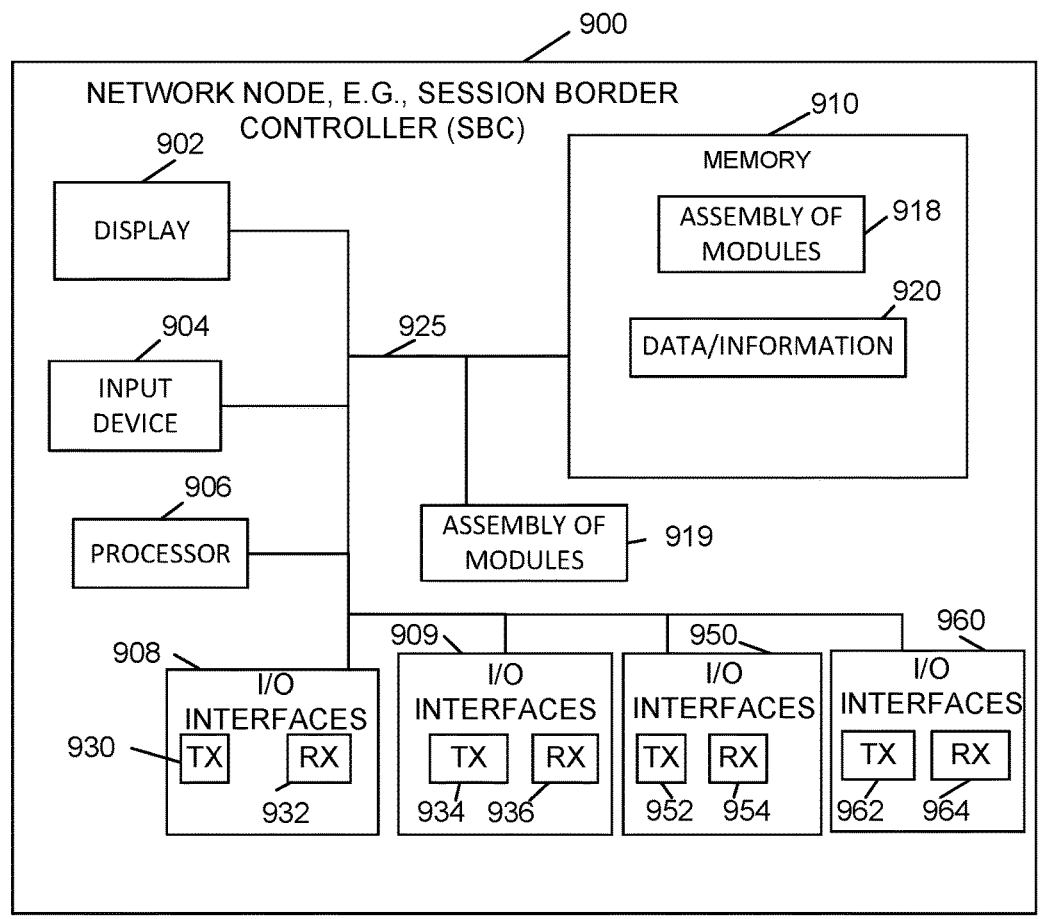
FIG. 9 illustrates an exemplary network node, e.g., Session Border Controller, in accordance with one or more embodiments of the present disclosure.

FIG. 9 illustrates an exemplary embodiment of a network node 900 in accordance with the present disclosure. In an embodiment, the network node 900 may be the network node 160 of FIG. 1. In additional or alternative embodiments, the network node 900 may be the Access-SBC/P-CSCF of FIGS. 3-6. In still another additional or alternative embodiments, the network node 900 may be the network node described in connection with the flow diagrams of FIGS. 7 and/or 8. Exemplary network node 900 includes a display 902, an input device 904, a processor 906, e.g., a CPU, input/output (I/O) interfaces 908, 909, 950, 960, which couple the network node to networks and/or various other devices including for example core network 170, base station 140, and access point 150; memory 910, and an assembly of modules 919, e.g., circuits corresponding to different modules, coupled together via a bus 925 over which the various elements may exchange data and information. Memory 910 includes an assembly of modules 918, e.g., an assembly of software modules, data/information 920. The I/O interfaces 908 include transmitters 930 and receivers 932. The I/O interfaces 909 include transmitters 934 and receivers 936. The I/O interfaces 950 include transmitters 952 and receivers 954. The I/O interfaces 960 include transmitters 962 and receivers 964. The network node 900 is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Transport Protocol packets of a media session. In some embodiments, the network node 900 does not include a display.

The I/O interfaces and transmitters and receivers included therein in some embodiments are configured to communicate in accordance with the Internet Protocol, Transport Control Protocol (TCP), User Datagram Protocol (UDP), Session Initiation Protocol (SIP), Session Description Protocol (SDP). In some embodiments, the network node 900 includes a communication module configured to operate using one or more of the following IP, TCP, UDP, SIP, and SDP protocols. In some embodiments, the communication module is a hardware module, a software module or a module including hardware and software components. In some embodiments, the network node is a Session Border Controller. In some embodiments, the network node performs the functions of proxy-call session control function. In some embodiments, the network node is a proxy-call session control function. In some embodiments, the exemplary network node 160 illustrated in FIG. 1 is implemented in accordance with description of the network node 900 illustrated in FIG. 9. The exemplary network node 900 can be configured to perform the steps and/or operation of other devices. The base station 140, access point 150, access device 192 and AS 180 of FIG. 1 may be, and in some embodiments are, implemented in accordance with the design of network node 900 but configured to perform the steps and/or operation of the particular device being implemented.

Several exemplary embodiments of the present invention will now be discussed in further detail.

In a first method embodiment, the method comprises the steps of: establishing, by a user equipment (UE), a connection to a serving access network using a first radio access technology (RAT) of the UE; registering, by the UE, with a network over the connection to the serving access network; establishing, by the UE, a communication session between the UE and a remote UE, wherein the communication session is provided via a serving leg and a remote leg, the serving leg comprises a media path between the UE and the network and the remote leg comprises a media path between the network and the remote UE, wherein the serving leg is provided, at least in part, by the connection to the serving access network; determining, by the UE, whether to handover the communication session from the serving access network to a target access network; in response to a determination to handover the communication session: establish a connection to the target access network using a second RAT of the UE; and transmitting, by the UE, a register message to the network over the connection to the target access network, wherein the register message is configured to refresh the registration of the UE with the network; and in response to refreshing the registration of the UE with the network over the connection to the target access network, initiating operations to handover the communication session from the serving access network to the target access network, wherein, after handover, the communication session between the UE and the remote UE is provided via a new serving leg, wherein the new serving leg comprises a new media path between the network and the UE, and wherein the new serving leg is provided, at least in part, by the connection to the target access network.

In a second method embodiment, the second method embodiment includes the steps of the first method embodiment wherein the serving access network is a wireless fidelity (Wi-Fi) access network, and wherein the target access network is a cellular access network.

In a third method embodiment, the third method embodiment includes the steps of the first method embodiment wherein the serving access network is a cellular access network, and wherein the target access network is a wireless fidelity (Wi-Fi) access network.

In a fourth method embodiment, the fourth method embodiment includes the steps of the first method embodiment wherein the media path between the network and the remote UE is maintained throughout the handing over.

In a fifth method embodiment, the fifth method embodiment includes the steps of the first method embodiment and further comprises activating a second RAT of the UE in response to the determination to handover the communication session, wherein UE established the connection to the target access network using the second RAT.

In a sixth method embodiment, the method includes the fifth method embodiment wherein activation of the second RAT comprises transitioning the second RAT from a low power mode of operation to a normal mode of operation.

In a seventh method embodiment, the method includes the fifth method embodiment wherein activation of the second RAT comprises providing operational power to the second RAT.

In an eighth method embodiment, the method includes the first method embodiment wherein the register message is transmitted to an Access-session border controller/proxy-call session control function (Access-SBC/P-CSCF) of the network and comprises a trigger that causes the Access-SBC/P-CSCF to interwork header information included in the register message prior to communicating the register message to one or more other components of the network to refresh the registration of the UE.

In a ninth method embodiment, the method includes the eighth method embodiment wherein the UE is not re-authenticated with the network during the refreshing of the registration of the UE with the network.

In a tenth method embodiment, the method includes the first method embodiment wherein the operations to hand over the communication session from the access network to the target access network comprises: transmitting, by the UE, an invite message to the network via the target access network, wherein the invite message comprises a trigger that indicates the invite message is associated with the communication session between the UE and the remote UE; receiving, from the network in response to transmitting the invite message, one or more parameters for establishing the new media path; and handing over the communication session to the new media path based at least in part on the one or more parameters.

In an eleventh method embodiment, the method includes the tenth method embodiment wherein transport layer security/secure real-time transport protocol (TLS/SRTP) is utilized for the connections to the access network and the target access network.

In an twelfth method embodiment, the method includes the eleventh method embodiment wherein the invite message comprises an SRTP key that is utilized for the communication session after the handing over.

In a thirteen method embodiment, the method includes the eleventh method embodiment wherein the trigger included in the invite message comprises a session transfer identifier (STI), and wherein the trigger included in the invite message causes the network to not send a re-invite message to the remote UE during the handing over of the communication session to from the access network to the target access network.

In a fourteenth embodiment, a user equipment (UE) comprises: a first radio access technology (RAT); a second RAT; a memory; and at least one processor communicatively coupled to the first RAT, the second RAT and the memory, the at least one processor configured to: establish a connection to an access network using the first RAT; register the UE with a network over the connection to the access network; establish a communication session between the UE and a remote UE, wherein the communication session is provided via a serving leg and a remote leg, wherein the serving leg comprises a media path between the UE and the network and the remote leg comprises a media path between the network and the remote UE, wherein the serving leg is provided, at least in part, by the connection to the access network; determine whether to handover the communication session from the access network to a target access network; and in response to a determination to handover the communication session: establish a connection to the target access network using the second RAT; and transmit a register message to the network over the connection to the target access network, wherein the register message is configured to refresh the registration of the UE with the network; and in response to refreshing the registration of the UE with the network over the connection to the target access network, initiate operations to handover the communication session from the access network to the target access network, wherein, after handover, the communication session between the UE and the remote UE is provided via a new serving leg, wherein the new serving leg comprises a new media path between the network and the UE, and wherein the new serving leg is provided, at least in part, by the connection to the target access network.

In a fifteenth embodiment, the fifteenth embodiment includes the UE of fourteenth embodiment wherein the access network is a wireless fidelity (Wi-Fi) access network, and wherein the target access network is a cellular access network.

In a sixteenth embodiment, the sixteenth embodiment includes the UE of the fourteenth embodiment wherein the access network is a cellular access network, and wherein the target access network is a wireless fidelity (Wi-Fi) access network.

In a seventeenth embodiment, the seventeenth embodiment includes the UE of the fourteenth embodiment wherein the media path between the network and the remote UE is maintained throughout the handing over.

In a eighteenth embodiment, the eighteenth embodiment includes the UE of the fourteenth embodiment wherein the at least one processor is further configured to activate the second RAT in response to the determination to handover the communication session, wherein activation of the second RAT comprises transitioning the second RAT from a low power mode of operation to a normal mode of operation or providing operational power to the second RAT.

In a nineteenth embodiment, the nineteenth embodiment includes the UE of eighteenth embodiment, wherein the at least one processor is configured to monitor one or more characteristics of the connection to the access network, and wherein the determination to handover the communication session is based at least in part on the one or more characteristics of the connection to the access network.

In a twentieth embodiment, the twentieth embodiment includes the UE of fourteenth embodiment wherein the register message is transmitted to an Access-session border controller/proxy-call session control function (SBC/P-CSCF) of the network, wherein the register message comprises a trigger that causes the Access-SBC/P-CSCF to interwork header information included in the register message prior to communicating the register message to one or more other components of the network to refresh the registration of the UE, and wherein the UE is not re-authenticated with the network during the refreshing of the registration of the UE with the network.

In a twenty first embodiment, the twenty first embodiment includes the UE of fourteenth embodiment wherein transport layer security/secure real-time transport protocol (TLS/SRTP) is utilized for the connections to the access network and the target access network, wherein the operations to hand over the communication session comprises: transmitting an invite message to the network via the target access network, wherein the invite message comprises a trigger that indicates the invite message is associated with the communication session between the UE and the remote UE, and wherein the invite message further comprises an SRTP key that is utilized for the communication session after the handing over; receiving, from the network in response to transmitting the invite message, one or more parameters for establishing the new media path; and handing over the communication session to the new media path based at least in part on the one or more parameters.

In a twenty second embodiment, the twenty second embodiment includes the UE of the twenty first embodiment wherein the trigger included in the invite message comprises a session transfer identifier (STI), and wherein the trigger included in the invite message causes the network to not send a re-invite message to the remote UE during the handing over of the communication session to from the access network to the target access network.

A twenty third embodiment includes a non-transitory computer-readable storage medium storing instructions that, when executed by a processor, cause the processor to perform operations comprising: establishing a connection between a user equipment (UE) and an access network using a first radio access technology (RAT) of the UE; registering the UE with a network over the connection to the access network; establishing a communication session between the UE and a remote UE, wherein the communication session is provided via a serving leg and a remote leg, wherein the serving leg comprises a media path between the UE and the network and the remote leg comprises a media path between the network and the remote UE, wherein the serving leg is provided, at least in part, by the connection to the access network; determining whether to handover the communication session from the access network to a target access network; and in response to a determination to handover the communication session: establishing a connection between the UE and the target access network using a second radio access RAT of the UE; and transmitting a register message to the network over the connection between the UE and the target access network, wherein the register message is configured to refresh the registration of the UE with the network; and in response to refreshing the registration of the UE with the network, initiating operations to handover the communication session, wherein, after handover, the communication session between the UE and the remote UE is provided via a new serving leg, wherein the new serving leg comprises a new media path between the network and the UE, wherein the new serving leg is provided, at least in part, by the connection between the UE and the target access network.

In a twenty fourth embodiment, the twenty fourth embodiment includes the non-transitory computer-readable storage medium of twenty third embodiment wherein the access network is a wireless fidelity (Wi-Fi) access network, and wherein the target access network is a cellular communication access network.

In a twenty fifth embodiment, the twenty fifth embodiment includes the non-transitory computer-readable storage medium of twenty third embodiment wherein the access network is a cellular communication access network, and wherein the target access network is a wireless fidelity (Wi-Fi) access network.

In a twenty sixth embodiment, the twenty sixth embodiment includes the non-transitory computer-readable storage medium of twenty third embodiment wherein the media path between the network and the remote UE is maintained throughout the handing over.

In a twenty seventh embodiment, the twenty seventh embodiment includes the non-transitory computer-readable storage medium of twenty third embodiment wherein the at least one processor is further configured to monitor one or more characteristics of the connection to the access network, and wherein the determination to handover the communication session is based at least in part on the one or more characteristics of the connection to the access network.

In a twenty eighth embodiment, the twenty eighth embodiment includes the non-transitory computer-readable storage medium of twenty seventh embodiment wherein the at least one processor is further configured to activate the second RAT in response to the determination to handover the communication session, wherein activation of the second RAT comprises transitioning the second RAT from a low power mode of operation to a normal mode of operation or providing operational power to the second RAT.

In a twenty ninth embodiment, the twenty ninth embodiment includes the non-transitory computer-readable storage medium of the twenty third embodiment wherein the register message is transmitted to an Access-session border controller/proxy-call session control function (SBC/P-CSCF) of the network, wherein the register message comprises a trigger that causes the Access-SBC/P-CSCF to interwork header information included in the register message prior to communicating the register message to one or more other components of the network to refresh the registration of the UE, and wherein the UE is not re-authenticated with the network during the refreshing of the registration of the UE with the network.

In a thirtieth embodiment, the thirtieth embodiment includes the non-transitory computer-readable storage medium of twenty third embodiment wherein transport layer security/secure real-time transport protocol (TLS/SRTP) is utilized for the connections to the access network and the target access network, wherein the operations to hand over the communication session comprise: transmitting an invite message to the network via the target access network, wherein the invite message comprises a trigger that indicates the invite message is associated with the communication session between the UE and the remote UE, and wherein the invite message further comprises an SRTP key that is utilized for the communication session after the handing over; receiving, from the network in response to transmitting the invite message, one or more parameters for establishing the new media path; and handing over the communication session to the new media path based at least in part on the one or more parameters.

In a thirty first embodiment, the thirty first embodiment includes a method comprising the steps of: receiving, by a network node operating between an access network and a core network, a register message from a user equipment (UE), wherein the register message is transmitted by the UE via a connection between the UE and a target access network subsequent to the UE establishing a communication session between the UE and a remote UE and is configured to refresh the registration of the UE with the core network, wherein the communication session is provided via a serving leg and a remote leg, wherein the serving leg comprises a media path between the UE and the network node and the remote leg comprises a media path between the network node and the remote UE, and wherein the serving leg is provided, at least in part, by a by connection between the UE and a serving access network; refreshing, by the network node, the registration of the UE with the core network based on the received register message; subsequent to refreshing the registration of the UE with the core network, receiving a handover message from the UE requesting handover of the communication session between the UE and the remote UE from the serving access network to the target access network; and in response to receiving the handover message from the UE, initiating operations to handover the communication session, wherein, after handover, the communication session between the UE and the remote UE is provided via a new serving leg, wherein the new serving leg comprises a new media path between the network node and the UE, and wherein the new serving leg is provided, at least in part, by a connection between the target access network and the UE.

In a thirty second embodiment, the thirty second embodiment includes the thirty first embodiment wherein the network node comprises an Access-session border controller/proxy-call session control function (Access-SBC/P-CSCF) operating at an edge of the core network.

In a thirty third embodiment, the thirty third embodiment includes the method of thirty first embodiment wherein the serving access network is a wireless fidelity (Wi-Fi) access network, and wherein the target access network is a cellular access network.

In a thirty fourth embodiment, the thirty fourth embodiment includes the method of thirty first embodiment wherein the network node comprises an Access-session border controller/proxy-call session control function (Access-SBC/P-CSCF) operating at an edge of the core network, and wherein the serving access network is a cellular access network, and wherein the target access network is a wireless fidelity (Wi-Fi) access network.

In a thirty fifth embodiment, the thirty fifth embodiment includes the method of thirty first embodiment wherein the media path between the network node and the remote UE is maintained throughout the handing over.

In a thirty sixth embodiment, the thirty sixth embodiment includes the method of the thirty first embodiment wherein the register message received by the network node comprises a trigger that causes the network node to refresh the registration of the UE with the core network, and the method further comprises the steps of: interworking, by the network node in response to detecting the trigger included in the register message, header information included in the register message to produce an interworked register message; and providing, by the network node, the interworked register message to a registration node of the core network to refresh the registration of the UE.

In a thirty seventh embodiment, the thirty seventh embodiment includes the method of thirty sixth embodiment wherein the UE is not re-authenticated with the core network during the refreshing of the registration of the UE.

In a thirty eighth embodiment, the thirty eighth embodiment includes the method of thirty sixth embodiment wherein interworking, by the network node, the header information of the register message comprises updating a Contact header field, a From header field, a To header field, and a Call identifier (Call ID) field included in the register message.

In a thirty ninth embodiment, the thirty ninth embodiment includes the method of thirty eighth embodiment wherein updating the Contact header field modifies address information included in the Contact header field to point to an address of the network node, wherein updating the From header field provides a tag value that points to the registration of the UE with the core network on the serving access network, wherein updating the To header field inserts a tag value that points to the registration of the UE with the core network on the serving access network, wherein updating the Call ID field provides a tag value that points to the registration of the UE with the core network on the serving access network, wherein the register message comprises an Authorization header that includes non-empty nonce and response fields configured by the UE, wherein the interworked register message comprises the Authorization header, and wherein the interworking does not change the Authorization header.

In a fortieth embodiment, the fortieth embodiment includes the method of thirty first embodiment wherein the handover message comprises an invite message, wherein the invite message is transmitted by the UE over the connection between the UE and the target access network, wherein the invite message comprises a trigger that indicates the invite message is associated with the communication session between the UE and the remote UE, and wherein the operations to handover the communication session comprise: transmitting, by the network node, one or more parameters for handing over the communication session to the UE in response to detecting the trigger included the invite message received from the UE.

In a forty first embodiment, the forty first embodiment includes the method of fortieth embodiment wherein transport layer security/secure real-time transport protocol (TLS/SRTP) is utilized for the communication session before and after the handing over.

In a forty second embodiment, the forty second embodiment includes the method of forty first embodiment wherein the invite message received from the UE comprises an SRTP key that is utilized for the communication session after the handing over.

In a forty third embodiment, the forty third embodiment includes the method of fortieth embodiment wherein the network node does not send a re-invite message to the remote UE in response to detecting the trigger included in the invite message received from the UE.

In a forty fourth embodiment, the forty fourth embodiment includes a network node operating between one or more access networks and a core network, the network node comprising: at least one communication interface configured to receive and transmit data over one or more networks; a memory; and at least one processor communicatively coupled to the at least one communication interface and the memory, the at least one processor configured to: receive, via the at least one communication interface, a register message from a user equipment (UE), wherein the register message is transmitted by the UE via connection between the UE and a target access network subsequent to the UE establishing a communication session between the UE and a remote UE, wherein the communication session is provided via a serving leg and a remote leg, wherein the serving leg comprises a media path between the UE and the network node and the remote leg comprises a media path between the network node and the remote UE, and wherein the serving leg is provided, at least in part, by a connection between the UE and a serving access network; initiate operations to refresh the registration of the UE with the core network based on the register message; subsequent to refreshing the registration of the UE with the core network, receive, via the at least one communication interface, a handover message from the UE requesting handover of the communication session between the UE and the remote UE from the serving access network to the target access network; and in response to receiving the handover message from the UE, initiate operations to handover the communication session, wherein, after handover, the communication session between the UE and the remote UE is provided via a new serving leg, wherein the new serving leg comprises a new media path between the network node and the UE, and wherein the new serving leg is provided, at least in part, by the connection between the target access network and the UE.

In a forty fifth embodiment, the forty fifth embodiment includes the network node of the forty fourth embodiment wherein the network node comprises an Access-session border controller/proxy-call session control function (Access-SBC/P-CSCF) operating at an edge of the core network.

In a forty sixth embodiment, the forty sixth embodiment the network node of forty fourth embodiment wherein the serving access network is a wireless fidelity (Wi-Fi) access network, and wherein the target access network is a cellular access network.

In a forty seventh embodiment, the forty seventh embodiment including the network node of forty fourth embodiment wherein the serving access network is a cellular access network, and wherein the target access network is a Wi-Fi access network.

In a forty eighth embodiment, the forty eighth embodiment includes the network node of the forty fourth embodiment wherein the media path between the network node and the remote UE is maintained throughout the handing over.

In a forty ninth embodiment, the forty ninth embodiment includes the network node of the forty fourth embodiment wherein the register message received by the network node comprises a trigger that causes the network node to refresh the registration of the UE with the core network, the at least one processor further configured to: interwork header information included in the register message to produce an interworked register message in response to detecting the trigger included in the register message; and provide, via the at least one communication interface, the interworked register message to a registration node of the core network to refresh the registration of the UE.

In a fiftieth embodiment, the fiftieth embodiment includes the network node of forty ninth embodiment wherein the UE is not re-authenticated with the core network during the refreshing of the registration of the UE.

In a fifty first embodiment, the fifty first embodiment includes the network node of the forty ninth embodiment wherein interworking the header information of the register message comprises updating a Contact header field, a From header field, a To header field, and a Call identifier (Call ID) field included in the register message.

In a fifty second embodiment, the fifty second embodiment includes the network node of fifty first embodiment wherein updating the Contact header field modifies address information included in the Contact header field to point to an address of the network node, wherein updating the From header field provides a tag value that points to the registration of the UE with the core network on the serving access network, wherein updating the To header field inserts a tag value that points to the registration of the UE with the core network on the serving access network, wherein updating the Call ID field provides a tag value that points to the registration of the UE with the core network on the serving access network, wherein the register message comprises an Authorization header that includes non-empty nonce and response fields configured by the UE, wherein the interworked register message comprises the Authorization header, and wherein the interworking does not change the Authorization header.

In a fifty third embodiment, the fifty third embodiment includes the network node of the forty fourth embodiment wherein the handover message comprises an invite message, wherein the invite message is transmitted by the UE over the connection between the UE and the target access network, wherein the invite message comprises a trigger that indicates the invite message is associated with the communication session between the UE and the remote UE, and wherein the operations to handover the communication session comprise: transmitting, via the at least one communication interface, one or more parameters for handing over the communication session to the UE in response to detecting the trigger included the invite message received from the UE.

In a fifty fourth embodiment, the fifty fourth embodiment includes the network node of the fifty third embodiment wherein transport layer security/secure real-time transport protocol (TLS/SRTP) is utilized for the communication session before and after the handing over, and wherein the invite message received from the UE comprises a new SRTP key that is utilized for the communication session after the handing over.

In a fifty fifth embodiment, the fifty fifth embodiment includes the network node of fifty third embodiment wherein the network node does not send a re-invite message to the remote UE in response to receiving the invite message from the UE.

In a fifty sixth embodiment, the fifty sixth embodiment includes a non-transitory computer-readable storage medium storing instructions that, when executed by at least one processor, cause the processor to perform operations, the operations comprising: receiving, by a network node operating between an access network and a core network, a register message from a user equipment (UE), wherein the register message is transmitted by the UE via a connection between the UE and a target access network subsequent to the UE establishing a communication session between the UE and a remote UE and is configured to refresh the registration of the UE with the core network, wherein the communication session is provided via a serving leg and a remote leg, wherein the serving leg comprises a media path between the UE and the network node and the remote leg comprises a media path between the network node and the remote UE, and wherein the serving leg is provided, at least in part, by a by connection between the UE and a serving access network; refreshing, by the network node, the registration of the UE with the core network based on the register message; subsequent to refreshing the registration of the UE with the core network, receiving a handover message from the UE requesting handover of the communication session between the UE and the remote UE from the serving access network to the target access network; and in response to receiving the handover message from the UE, initiating operations to handover the communication session, wherein, after handover, the communication session between the UE and the remote UE is provided via a new serving leg, wherein the new serving leg comprises a new media path between the network node and the UE, and wherein the new serving leg is provided, at least in part, by a connection between the target access network and the UE.

In a fifty seventh embodiment, the fifty seventh embodiment includes the non-transitory computer-readable storage medium of fifty sixth embodiment wherein the network node comprises an Access-session border controller/proxy-call session control function (Access-SBC/P-CSCF) operating at an edge of the core network.

In a fifty eighth embodiment, the fifty eighth embodiment includes the non-transitory computer-readable storage medium of the fifty sixth embodiment, wherein the serving access network is a wireless fidelity (Wi-Fi) access network, and wherein the target access network is a cellular access network.

In a fifty ninth embodiment, the fifty ninth embodiment includes the non-transitory computer-readable storage medium of the fifty sixth embodiment wherein the serving access network is a cellular access network, and wherein the target access network is a wireless fidelity (Wi-Fi) access network.

In a sixtieth embodiment, the sixtieth embodiment includes the non-transitory computer-readable storage medium of the fifty sixth embodiment wherein the media path between the network node and the remote UE is maintained throughout the handing over.

In a sixty first embodiment, the sixty first embodiment includes the non-transitory computer-readable storage medium of the fifty sixth embodiment wherein the register message received by the network node comprises a trigger that causes the network node to refresh the registration of the UE with the core network, the operations further comprising: interworking, by the network node in response to detecting the trigger included in the register message, header information included in the register message to produce an interworked register message; and providing, by the network node, the interworked register message to a registration node of the core network to refresh the registration of the UE.

In a sixty second embodiment, the sixty second embodiment includes the non-transitory computer-readable storage medium of sixty first embodiment wherein the UE is not re-authenticated with the core network during the refreshing of the registration of the UE.

In a sixty third embodiment, the sixty third embodiment includes the non-transitory computer-readable storage medium of the sixty first embodiment wherein interworking, by the network node, the header information of the register message comprises updating a Contact header field, a From header field, a To header field, and a Call identifier (Call ID) field included in the register message.

In as sixty fourth embodiment, the sixty fourth embodiment including the non-transitory computer-readable storage medium of the sixty third embodiment wherein updating the Contact header field modifies address information included in the Contact header field to point to an address of the network node, wherein updating the From header field provides a tag value that points to the registration of the UE with the core network on the serving access network, wherein updating the To header field inserts a tag value that points to the registration of the UE with the core network on the serving access network, wherein updating the Call ID field provides a tag value that points to the registration of the UE with the core network on the serving access network, wherein the register message comprises an Authorization header that includes non-empty nonce and response fields configured by the UE, wherein the interworked register message comprises the Authorization header, and wherein the interworking does not change the Authorization header.

In a sixty fifth embodiment, the sixty fifth embodiment including the non-transitory computer-readable storage medium of fifty sixth embodiment wherein the handover message comprises an invite message, wherein the invite message is transmitted by the UE over the connection between the UE and the target access network, wherein the invite message comprises a trigger that indicates the invite message is associated with the communication session between the UE and the remote UE, and wherein the operations to handover the communication session comprise: transmitting, by the network node, one or more parameters for handing over the communication session to the UE in response to detecting the trigger included the invite message received from the UE.

In a sixty sixth embodiment, the sixty sixth embodiment includes the non-transitory computer-readable storage medium of sixty fifth embodiment wherein transport layer security/secure real-time transport protocol (TLS/SRTP) is utilized for the communication session before and after the handing over.

In a sixty seventh embodiment, the sixty seventh embodiment includes the non-transitory computer-readable storage medium of the sixty sixth embodiment wherein the invite message received from the UE comprises an SRTP key that is utilized for the communication session after the handing over.

In a sixty eighth embodiment, the sixty eighth embodiment includes the non-transitory computer-readable storage medium of sixty fifth embodiment wherein the network node does not send a re-invite message to the remote UE in response to detecting the trigger included in the invite message received from the UE.

The techniques of various embodiments may be implemented using software, hardware and/or a combination of software and hardware. Various embodiments are directed to apparatus, e.g., session border controllers, communications devices, user devices, telecommunications systems, network nodes and/or network equipment devices. Various embodiments are also directed to methods, e.g., method of controlling and/or operating, communications devices, session border controllers, telecommunications equipment, network nodes and/or network equipment devices. Servers may be implemented on processors of devices such as computers and network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of the elements or steps are implemented using hardware circuitry. In some embodiments, each of the elements or steps are implemented using an application specific integrated circuit. In some embodiments, the steps are implemented with hardware circuitry specifically designed and/or dedicated to perform the step in a highly efficient and computationally fast manner at or approaching wire speed.

In various embodiments nodes and/or elements described herein are implemented using one or more modules to perform the steps corresponding to one or more methods, for example, message reception, message generation, signal processing, sending, determining and/or transmission steps. Thus, in some embodiments various features are implemented using modules or in some embodiments logic such as for example logic circuits. Such modules may be implemented using software, hardware or a combination of software and hardware. In some embodiments, one or more modules may be implemented as hardware circuitry in a processor. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, including a processor configured to implement one, multiple or all of the steps of one or more methods of the invention.

In some embodiments, the processor or processors, e.g., CPUs, of one or more devices, e.g., session border controllers, communications devices, user equipment devices are configured to perform the steps of the methods described as being performed by the device, e.g., session border controller or user equipment device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node or device such as a session border controller or user device, with a processor which includes a module corresponding to each of the steps of the various described methods performed by the device in which the processor is included. In some but not all embodiments a device, e.g., communications node such as a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A method comprising:
  receiving, by a network node operating between an access network and a core network, a register message from a user equipment (UE), wherein the register message is transmitted by the UE via a connection between the UE and a target access network subsequent to the UE establishing a communication session between the UE and a remote UE and is configured to refresh the registration of the UE with the core network, wherein the communication session is provided via a serving leg and a remote leg, wherein the serving leg comprises a media path between the UE and the network node and the remote leg comprises a media path between the network node and the remote UE, and wherein the serving leg is provided, at least in part, by a connection between the UE and a serving access network;
refreshing, by the network node, the registration of the UE with the core network based on the received register message;
subsequent to refreshing the registration of the UE with the core network, receiving a handover message from the UE requesting handover of the communication session between the UE and the remote UE from the serving access network to the target access network; and
in response to receiving the handover message from the UE, initiating operations to handover the communication session, wherein, after handover, the communication session between the UE and the remote UE is provided via a new serving leg, wherein the new serving leg comprises a new media path between the network node and the UE, and wherein the new serving leg is provided, at least in part, by a connection between the target access network and the UE.

2. The method of claim 1, wherein the network node comprises an Access-session border controller/proxy-call session control function (Access-SBC/P-CSCF) operating at an edge of the core network, and wherein the serving access network is a wireless fidelity (Wi-Fi) access network, and wherein the target access network is a cellular packet switched (PS) access network.

3. The method of claim 1, wherein the network node comprises an Access-session border controller/proxy-call session control function (Access-SBC/P-CSCF) operating at an edge of the core network, and wherein the serving access network is a cellular packet switched (PS) access network, and wherein the target access network is a wireless fidelity (Wi-Fi) access network.

4. The method of claim 1 wherein the media path between the network node and the remote UE is maintained throughout the handover.

5. The method of claim 1, wherein the register message received by the network node comprises a trigger that causes the network node to refresh the registration of the UE with the core network, the method further comprising:
interworking, by the network node in response to detecting the trigger included in the register message, header information included in the register message to produce an interworked register message; and
providing, by the network node, the interworked register message to a registration node of the core network to refresh the registration of the UE.

6. The method of claim 5, wherein the UE is not re-authenticated with the core network during the refreshing of the registration of the UE.

7. A network node operating between one or more access networks and a core network, the network node comprising:
at least one communication interface configured to receive and transmit data over one or more networks;
a memory; and
at least one processor communicatively coupled to the at least one communication interface and the memory, the at least one processor configured to:
receive, via the at least one communication interface, a register message from a user equipment (UE), wherein the register message is transmitted by the UE via connection between the UE and a target access network subsequent to the UE establishing a communication session between the UE and a remote UE, wherein the communication session is provided via a serving leg and a remote leg, wherein the serving leg comprises a media path between the UE and the network node and the remote leg comprises a media path between the network node and the remote UE, and wherein the serving leg is provided, at least in part, by a connection between the UE and a serving access network;
initiate operations to refresh the registration of the UE with the core network based on the register message;
subsequent to refreshing the registration of the UE with the core network, receive, via the at least one communication interface, a handover message from the UE requesting handover of the communication session between the UE and the remote UE from the serving access network to the target access network; and
in response to receiving the handover message from the UE, initiate operations to handover the communication session, wherein, after handover, the communication session between the UE and the remote UE is provided via a new serving leg, wherein the new serving leg comprises a new media path between the network node and the UE, and wherein the new serving leg is provided, at least in part, by the connection between the target access network and the UE.

8. The network node of claim 7, wherein the network node comprises an Access-session border controller/proxy-call session control function (Access-SBC/P-CSCF) operating at an edge of the core network.

9. The network node of claim 7, wherein the serving access network is a wireless fidelity (Wi-Fi) access network, and wherein the target access network is a cellular packet switched (PS) access network.

10. The network node of claim 7, wherein the serving access network is a cellular packet switched (PS) access network, and wherein the target access network is a Wi-Fi access network.

11. The network node of claim 7, wherein the media path between the network node and the remote UE is maintained throughout the handing over.

12. The network node of claim 7, wherein the register message received by the network node comprises a trigger that causes the network node to refresh the registration of the UE with the core network, the at least one processor further configured to:
interwork header information included in the register message to produce an interworked register message in response to detecting the trigger included in the register message; and
provide, via the at least one communication interface, the interworked register message to a registration node of the core network to refresh the registration of the UE.

* * * * *